(12) United States Patent
Mei et al.

(10) Patent No.: US 11,449,944 B2
(45) Date of Patent: *Sep. 20, 2022

(54) COMPUTERIZED ART INVESTMENT ESTIMATION SYSTEM

(71) Applicant: Art Market Consultancy LLC, Portland, OR (US)

(72) Inventors: Jianping Mei, Portland, OR (US); Michael Moses, Portland, OR (US)

(73) Assignee: ART MARKET CONSULTANCY LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,323

(22) Filed: Dec. 10, 2021

(65) Prior Publication Data

US 2022/0101439 A1 Mar. 31, 2022

Related U.S. Application Data

(63) Continuation of application No. 16/941,186, filed on Jul. 28, 2020, now Pat. No. 11,200,622.

(60) Provisional application No. 62/900,412, filed on Sep. 13, 2019.

(51) Int. Cl.
*G06Q 40/06* (2012.01)
*G06F 9/451* (2018.01)

(52) U.S. Cl.
CPC .............. *G06Q 40/06* (2013.01); *G06F 9/451* (2018.02)

(58) Field of Classification Search
CPC ..................................... G06Q 40/00

USPC ........................................................ 705/35
See application file for complete search history.

(56) References Cited

U.S. PATENT DOCUMENTS

| 5,664,111 | A  | * | 9/1997  | Nahan ..................... | G06Q 10/02 705/26.8 |
| 6,161,099 | A  | * | 12/2000 | Harrington ............ | G06Q 40/06 705/36 R |
| 6,505,174 | B1 | * | 1/2003  | Keiser .................... | G06Q 40/04 705/36 R |
| 6,671,674 | B1 | * | 12/2003 | Anderson .............. | G06Q 30/08 705/37 |
| 7,136,833 | B1 | * | 11/2006 | Podsiadlo .............. | G06Q 30/08 705/37 |
| 7,216,103 | B2 | * | 5/2007  | Friedland ............. | G06Q 50/188 705/37 |
| 7,225,152 | B2 | * | 5/2007  | Atkinson ............... | G06Q 30/08 705/37 |

(Continued)

*Primary Examiner* — Kirsten S Apple
(74) *Attorney, Agent, or Firm* — Alleman Hall Creasman & Tuttle LLP

(57) ABSTRACT

An art investment estimation system is provided that is updated to include a first sale price and date, and a second sale price and date of a plurality of repeat sale pairs of a plurality of works of art associated with an artist. The system determines one or more investment value variables derived from the first sale price and associated first sale date and the second sale price and associated second sale date for the plurality of repeat sale pairs of the plurality of works of art. The system receives, at a graphical user interface (GUI), input from a user designating weights for the investment value variables for an artist. The system determines, from the designated weights and the investment value variables, an artist investment potential value for the artist and, at the GUI, displays to the user the artist investment potential value.

22 Claims, 15 Drawing Sheets

(56) References Cited

U.S. PATENT DOCUMENTS

| | | | | |
|---|---|---|---|---|
| 7,315,840 B1* | 1/2008 | Keith | G06Q 40/00 | 705/37 |
| 7,487,124 B2* | 2/2009 | Boutilier | G06Q 40/04 | 705/37 |
| 7,720,743 B1* | 5/2010 | Marks | G06Q 40/025 | 705/37 |
| 7,729,950 B2* | 6/2010 | Mendizabal | G06Q 40/04 | 705/26.3 |
| 7,844,540 B2* | 11/2010 | Boutilier | G06Q 30/08 | 705/37 |
| 2001/0051940 A1* | 12/2001 | Soulanille | G06F 16/951 | 707/999.005 |
| 2002/0116215 A1* | 8/2002 | Lawrence | G06Q 30/0279 | 705/37 |
| 2002/0174060 A1* | 11/2002 | Friedland | G06Q 50/188 | 705/37 |
| 2003/0078873 A1* | 4/2003 | Cohen | G06Q 30/08 | 705/37 |
| 2003/0225680 A1* | 12/2003 | Desmond | G06Q 30/06 | 705/37 |
| 2004/0010461 A1* | 1/2004 | Boutilier | G06F 17/18 | 705/37 |
| 2004/0133503 A1* | 7/2004 | Podsiadlo | G06Q 40/04 | 705/37 |
| 2005/0044032 A1* | 2/2005 | Lee | G06Q 30/08 | 705/37 |
| 2006/0190392 A1* | 8/2006 | Samid | G07F 17/3288 | 705/37 |
| 2008/0270290 A1* | 10/2008 | Harrington | G06Q 30/08 | 705/37 |
| 2008/0294544 A1* | 11/2008 | Harrington | G06Q 40/06 | 705/37 |
| 2009/0030835 A1* | 1/2009 | Burns | G06Q 40/04 | 705/37 |
| 2009/0112750 A1* | 4/2009 | Boutilier | G06F 17/10 | 705/37 |
| 2010/0198658 A1* | 8/2010 | Marks | G06Q 30/0601 | 705/26.1 |
| 2011/0302071 A1* | 12/2011 | MacMahan | G06Q 30/08 | 705/37 |
| 2012/0123893 A1* | 5/2012 | Levin | G06Q 30/02 | 705/26.3 |
| 2013/0013443 A1* | 1/2013 | Christie | G06Q 10/06 | 705/26.4 |
| 2014/0032443 A1* | 1/2014 | Ossanna | G06Q 40/06 | 705/36 R |
| 2014/0372203 A1* | 12/2014 | Powell | G06Q 30/0243 | 705/14.42 |
| 2018/0025366 A1* | 1/2018 | Perriman | G06Q 30/0202 | 705/5 |

* cited by examiner

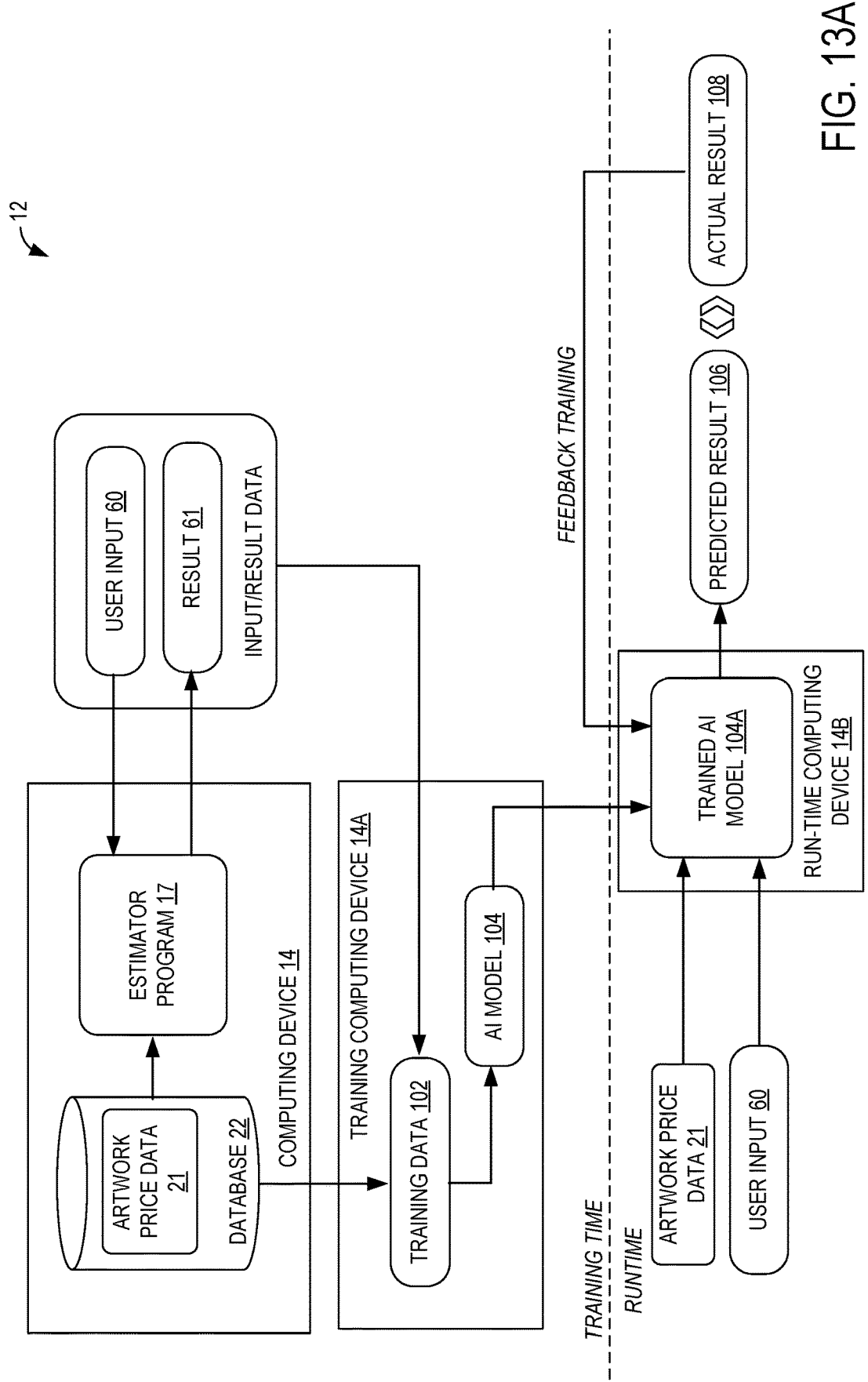

US 11,449,944 B2

COMPUTERIZED ART INVESTMENT ESTIMATION SYSTEM

CROSS-REFERENCE TO RELATED APPLICATIONS

This application is a continuation of U.S. patent application Ser. No. 16/941,186, filed Jul. 28, 2020 and entitled COMPUTERIZED ART INVESTMENT ESTIMATION SYSTEM, which claims the benefit of U.S. Provisional Patent Application No. 62/900,412, filed Sep. 13, 2019 and entitled ART INVESTMENT CALCULATOR the entire disclosures of each of which are hereby incorporated herein by reference for all purposes.

BACKGROUND

Each year, works of art are sold at a wide variety of venues. Works of art that are available for sale may be hundreds of years old or relatively new works; they may be produced by well-known artists, relatively unknown artists, or artists who are newly discovered. For works of art that have been produced by artists with established reputations or who are currently popular, art auctions represent a certain percentage of works of art that are available for sale in any given year. Art auction houses may determine the price of a work of art to be auctioned based on a number of variables, including market trends, comparative sales, estimated buyer interest, and so forth. Although buyers of art may purchase a particular work of art out of personal interest, investment potential may also be of significant interest to art buyers.

SUMMARY

A computerized art investment estimation system is provided. The system may include a processor and associated memory. The processor may be configured to execute one or more programs stored in the memory to store, in the memory, a database that may be continually updated to include a first sale price and associated first sale date and a second sale price and associated second sale date of a plurality of repeat sale pairs of a plurality of works of art associated with an artist. The processor may be configured to determine one or more investment value variables derived at least from the first sale price and associated first sale date and the second sale price and associated second sale date for the plurality of repeat sale pairs of the plurality of works of art. The processor may be configured to receive, at a graphical user interface (GUI), input from a user designating weights for the one or more investment value variables. The processor may be configured to determine, from the designated weights and the one or more investment value variables, an artist investment potential value for the artist and, at the GUI, display to the user the artist investment potential value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 13A and 13B are schematic diagrams illustrating application of an artificial intelligence model to improve the performance of the art investment estimation system of FIG. 1.

DETAILED DESCRIPTION

Determining the value of a work of art has been known to include an element of precariousness. Estimates of the value of a given work of art may be produced by professional evaluators and/or auction houses and may attempt to account for liquidity, historical sales data, current buyer interest, and other relevant factors. However, historically within the art market there has been a lack of reliable measures of the industry that may provide solid indicators of investment values for works of art by a particular artist. As such, a buyer interested in art as an investment may find little transparent information on how to choose a work of art for purchase.

Figure 1:
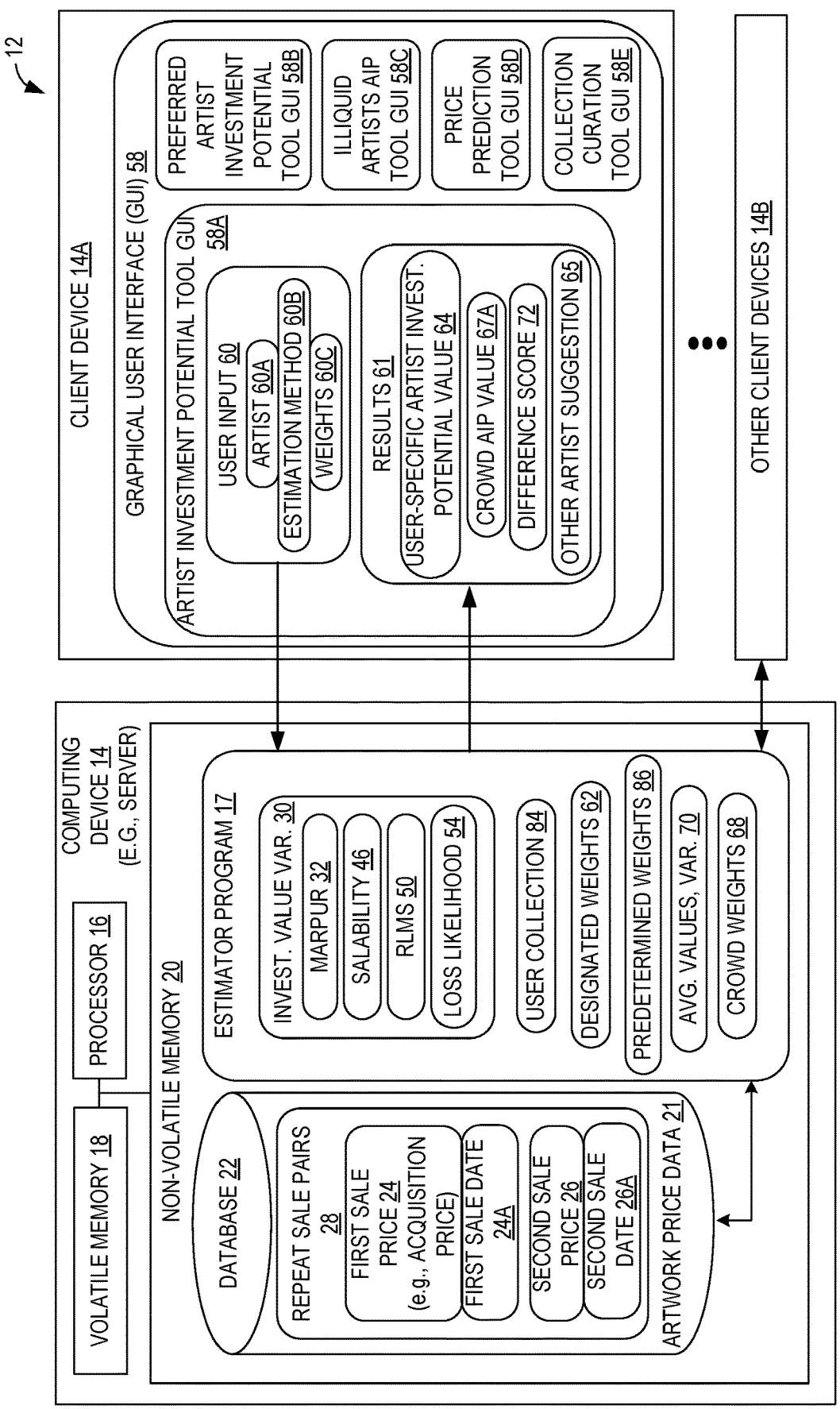
FIG. 1 shows a computerized art investment estimation system according to an example implementation of the present disclosure.

Systems and methods for an art investment estimation are described herein. FIG. 1 shows a computerized art investment estimation system 12 according to an example implementation of the present disclosure. The system 12 may be implemented using one or more computing devices 14, each of which may include a processor 16 and associated memory. The associated memory may include volatile memory 18 and non-volatile memory 20. The processor may be a CPU, GPU, FPGA, ASIC, or other type of processor or integrated circuit. The processor 16 may be configured to execute one or more programs, such as estimator program 17, stored in the memory, specifically in the non-volatile memory 20. System 12 is illustrated as a client-server system, in which computing device 14 is configured as a server, which is capable of communicating over computer network such as the Internet with a plurality of client devices including client device 14A and other client devices 14B, on which a graphical user interface (GUI) 58 of the estimator program 17 is displayed. In this embodiment, the estimator program 17 may be implemented as a server application and the graphical user interface 58 may be implemented as a native client application or a run-time executable displayed in a web browser, for example. Alternatively, the system 12 may be configured as a single computer system in which the estimator program 17 and graphical user interface 58 are executed and displayed on the same computing device, for example as a single native application running a single thread executed on the processor 16.

Figure 7:
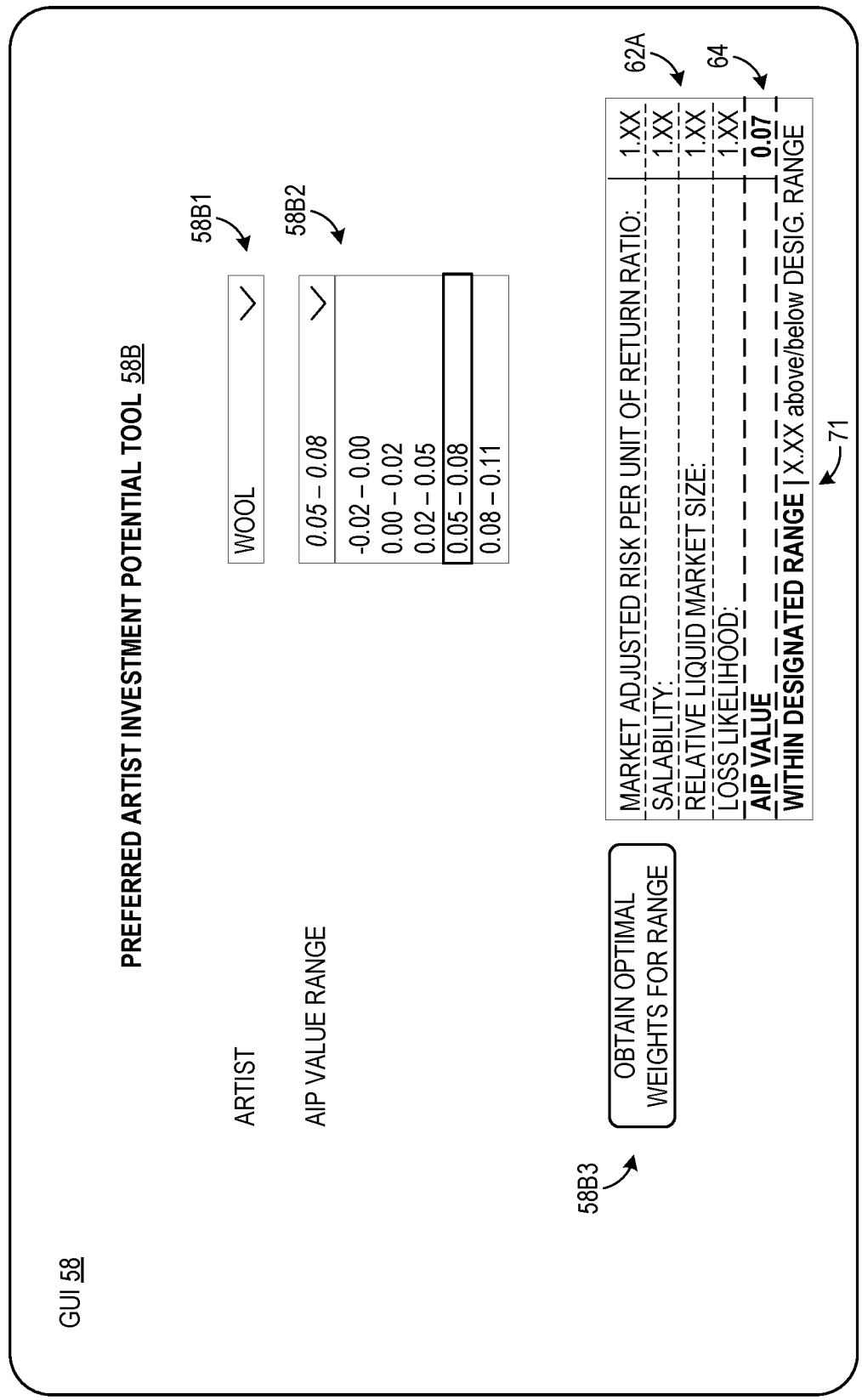
FIG. 7 shows an example implementation of a graphical user interface displaying a preferred artist investment potential range tool that may be used, in combination with the estimator program of FIG. 1, to determine weights for a preferred artist investment potential value.
Figure 8:
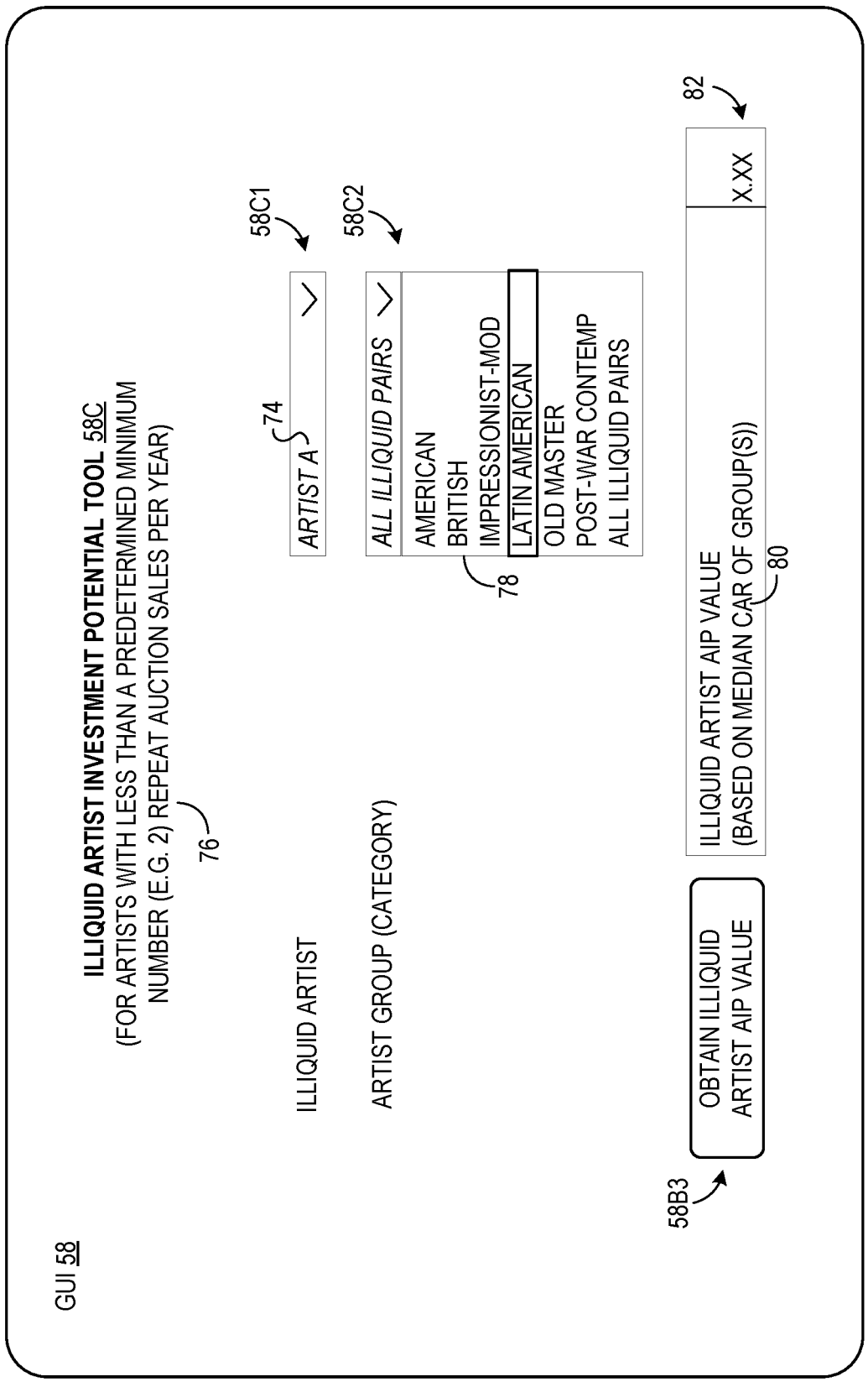
FIG. 8 shows an example implementation of a graphical user interface displaying an illiquid artist investment potential tool that may be used, in combination with the estimator program of FIG. 1, to determine an illiquid artist investment potential value based on data for the group or category of the illiquid artists.
Figure 9:
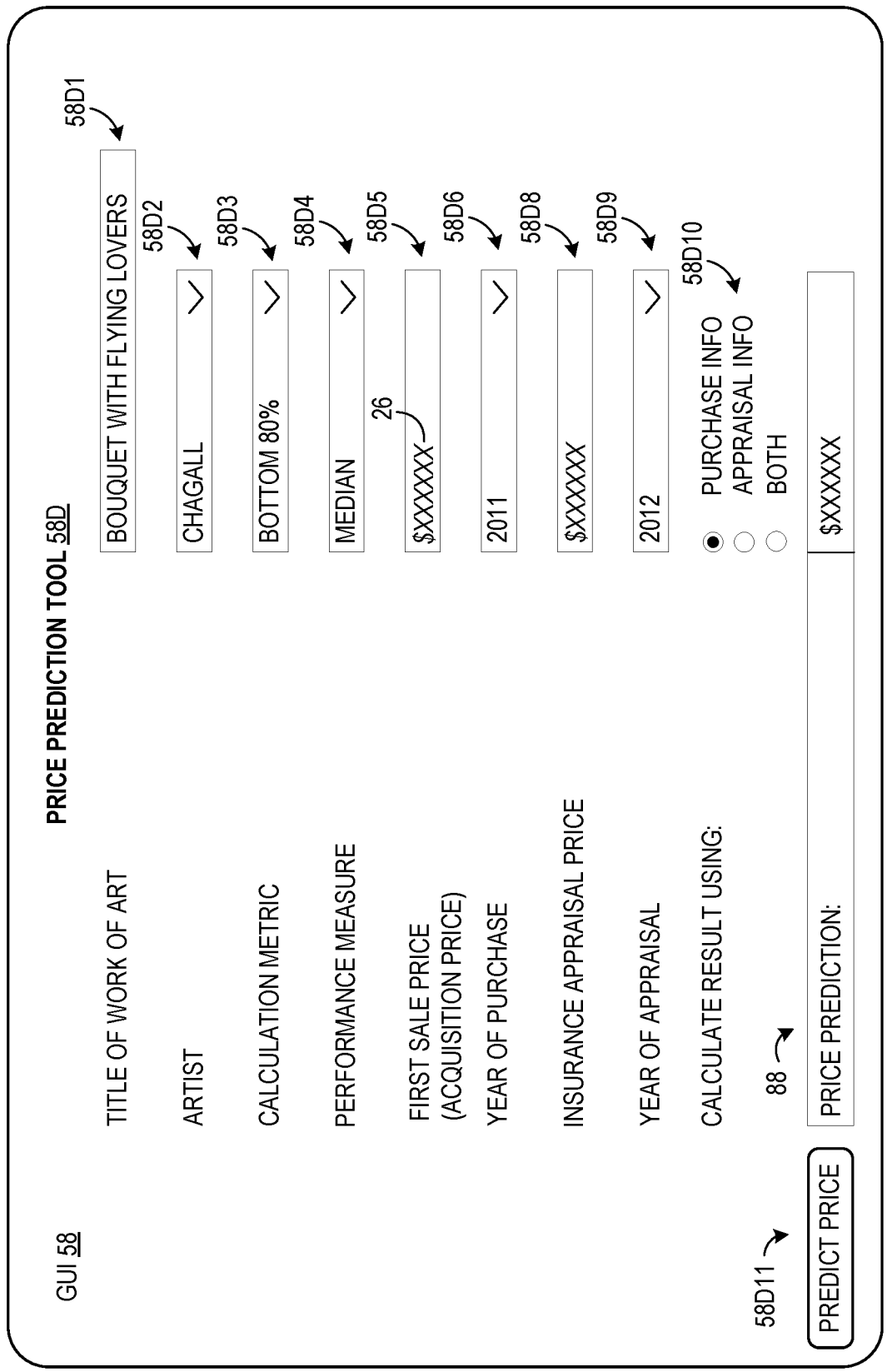
FIG. 9 shows an example implementation of a graphical user interface displaying a price prediction tool that may be used, in combination with the estimator program of FIG. 1, to determine a price prediction of a work of art.
Figure 10:
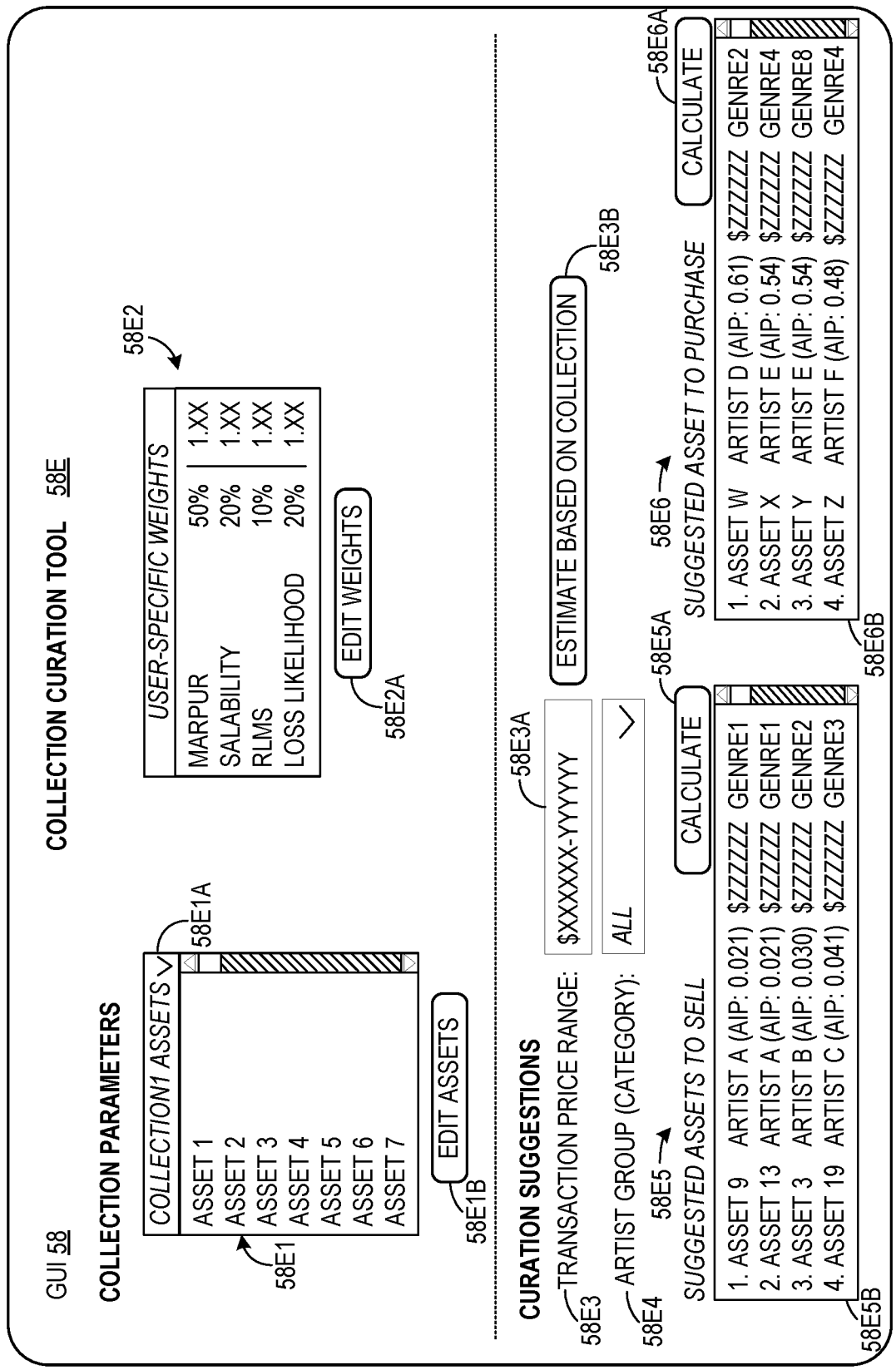
FIG. 10 shows an example implementation of a graphical user interface displaying a collection curation tool that may be used, in combination with the estimator program of FIG. 1, to determine suggestions for divesting a work of art and/or adding a work of art to a user's collection, based on user-specific weights for behavioral investment variables and artist investment potential values computed based on these weights.

Continuing with FIG. 1, a determination of an artist investment potential (AIP) value via the computerized art investment estimation system 12 relies on artwork price data 21 stored in a database 22 in the non-volatile memory 20. While database 22 is depicted being stored on the same computing device 14 as the estimator program 17 is executed, it will be appreciated that the database 22 may be implemented on a different computer, such as a separate database server computing device. Artwork price data 21 includes repeat sale pairs of works of art that have been sold and purchased at public auction. The database 22 is configured to be updated to include the latest artwork price data 21 from recent sales, and may be updated continually to ensure the most recently available sales data are contained within the database. The artwork price data 21 includes a first sale price 24 and a second sale price 26 of a plurality of repeat sale pairs 28 of a plurality of works of art associated with an artist. The sales pairs may be associated with the artist due to the artist having created the works of art, for example. As another example, where sales pair data are not sufficiently available for an illiquid artist, the sales pairs may be associated with the artist by being associated with a category or group to which the artist belongs. It will be appreciated that the first sale price may be, for example, an acquisition price paid by an acquirer for a work of art, and the second sale price may be a sale price at which the same acquirer sold the work of art. Alternatively, the second sale price may be a price paid to a subsequent owner of the work of art. Database 22 stores a sale date for each sale price, and thus includes an associated first sale date 24A for the first sale price 24 and an associated second sale date 26A for the second sale price 26, for each of the repeat sale pairs 28. The sales dates 24A and 26A may be used to compute an annualized return for each sale pair 28. Continual updating may include, for example, the database 22 being updated periodically at appropriate intervals, such as at the conclusion of each art auction season with new data of sales of works of art. In the implementations discussed below in relation to FIG. 6, a particular target artist 60A, estimation method 60B, and weights 60C, collectively forming user input 60, may be specified by a user of client device 14A via an AIP tool 58A of the estimator program 17 displayed on GUI 58, where the user is interested in discovering the investment potential of works of art by the specified artist. The weights 60C are referred to as behavioral factors, since they are determined by the behavior of each user, and reflect each user's behavioral approach to investing. The user input 60 is transmitted from the client device 14A to the estimator program 17 of the computing device 14. The computing device 14 processes the user input 60 and returns results 61 for display on the client device 14A. The results 61 may include, for example, a user-specific artist investment potential 64, crowd AIP value 67A, difference score 72, and other artist suggestions 65, as will be explained further below. Other tools of the estimator program 17 may also be displayed on the GUI 58, including a preferred AIP tool 58B, a detailed view of which is shown in FIG. 7, an illiquid artists AIP tool 58C, a detailed view of which is shown in FIG. 8, a price prediction tool 58D, a detailed view of which is shown in FIG. 9, and a collection curation tool 58E, a detailed view of which is shown in FIG. 10.

Continuing with FIG. 1, the processor 16, executing the estimator program 17, may be configured to determine one or more investment value variables 30 derived at least from the first sale price 24 and the second sale price 26 for the plurality of repeat sale pairs 28 of a plurality of works of art associated with the artist 60A indicated by the user input 60. The one or more investment value variables 30 may include a market adjusted risk per unit of return ratio (MARPUR) 32, salability 46, relative artist liquid market size (RLMS) 50, and artist loss likelihood (LL) 54.

Figure 2:
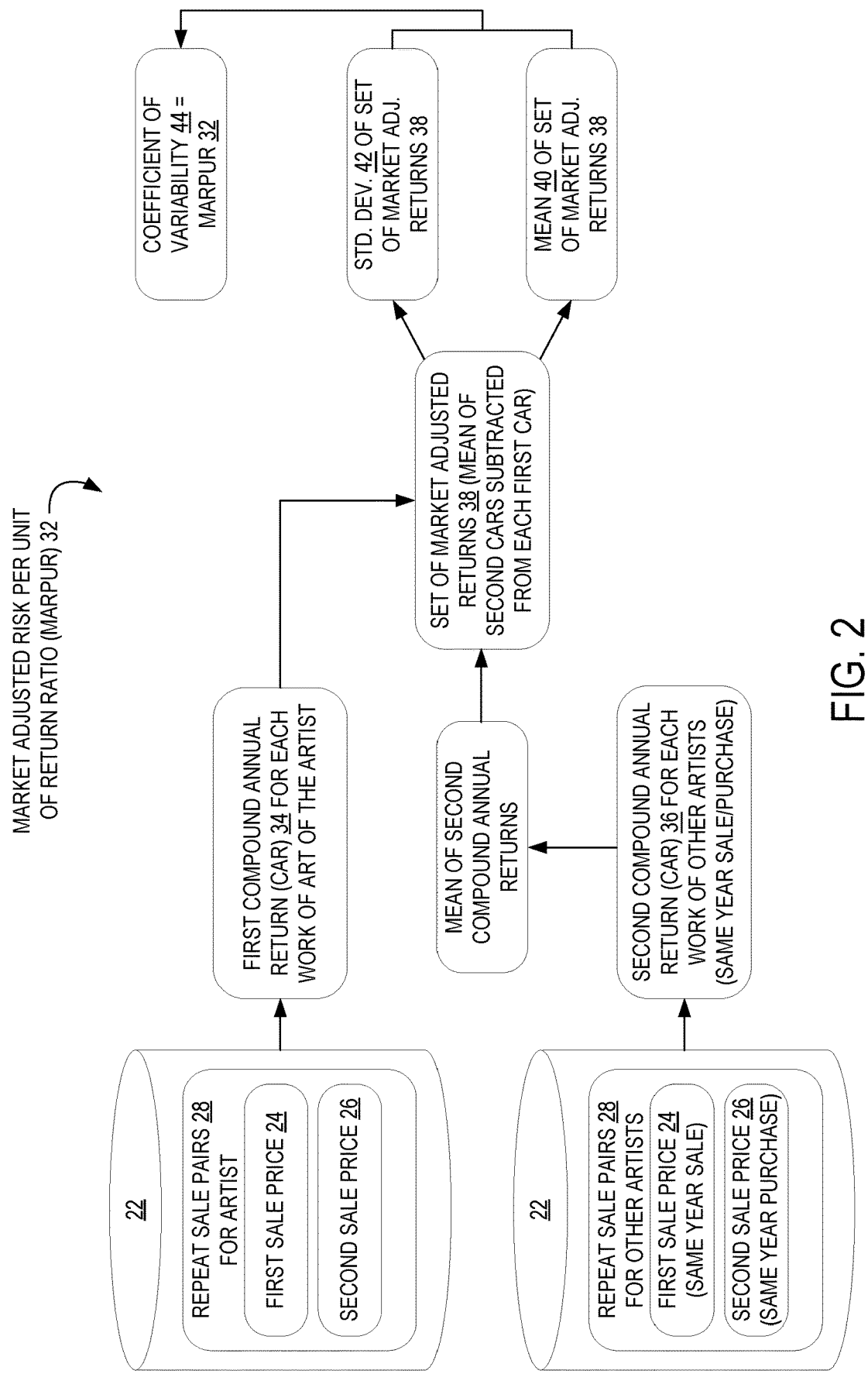
FIG. 2 shows a flowchart of an algorithm for calculating market adjusted risk per unit of return ratio implemented by an estimator program of the system of FIG. 1.

FIG. 2 shows an example implementation of determining MARPUR 32 via the art investment estimation system 12. As illustrated in FIG. 2, the processor 16 may be configured to determine a first compound annual return (CAR) 34 that may be for each work of art of the specified artist in the database 22. CAR may be determined in general, for example, by dividing a second sale price (e.g., a sale price obtained by the acquirer when selling the work of art) by a first sale price (e.g., an acquisition price by the acquirer), raising the value to 1/n where n is a number of years, and subtracting one, as in:

$$CAR = \left(\frac{\text{second sale price}}{\text{first sale price}}\right)^{\frac{1}{n}} - 1$$

This determination may be made for each work of art in the database 22 that is by the artist specified by the user. It will be appreciated that n may be computed by subtracting the first sale date from the second sale date and expressing the difference in years. The processor 16 may be configured to determine a second CAR 36 that may be for each work of art in the database 22 for a same year sale and same year purchase as each of the works of art of the artist. For example, if the specified artist had a work of art sell in 1984 and again in 1994, a second CAR 36 may be determined for a work of art by another artist that also sold in 1984 and again in 1994. The second CAR 36, then, may be computed for each work of art by another artist in the database 22 that sold in the years 1984 and 1994. If the specified artist has another work of art that sold in the years 1997 and 2011, a second CAR 36 would also be computed for any other work of art by another artist that sold in those same years. The processor 16 may be further configured to subtract the mean of the second CARs 36 from each of the first CARs to determine a set of market adjusted returns 38 for the specified artist. The processor 16 may be configured to determine the mean 40 of the set of market adjusted returns 38 and divide the mean 40 of the set of market adjusted returns 38 into a standard deviation 42 of the set of market adjusted returns 38 for the specified artist to determine a coefficient of variability 44 that is the MARPUR 32.

It will be appreciated that the MARPUR 32 is a dimensionless number representing a risk per unit of return; thus, the smaller a positive value for MARPUR 32, the less risk there is per unit of return. The value of MARPUR 32 may be negative for an artist underperforming the market return. A low negative value for MARPUR 32 and a high positive value for MARPUR 32 may both represent increased risk per unit of return. An example range for MARPUR 32 may be, in one example −50 to +50, in another example 0.1 to 2.5, and yet other values in other example applications; this value may be especially sensitive to one or a few outlier values.

Figure 3:
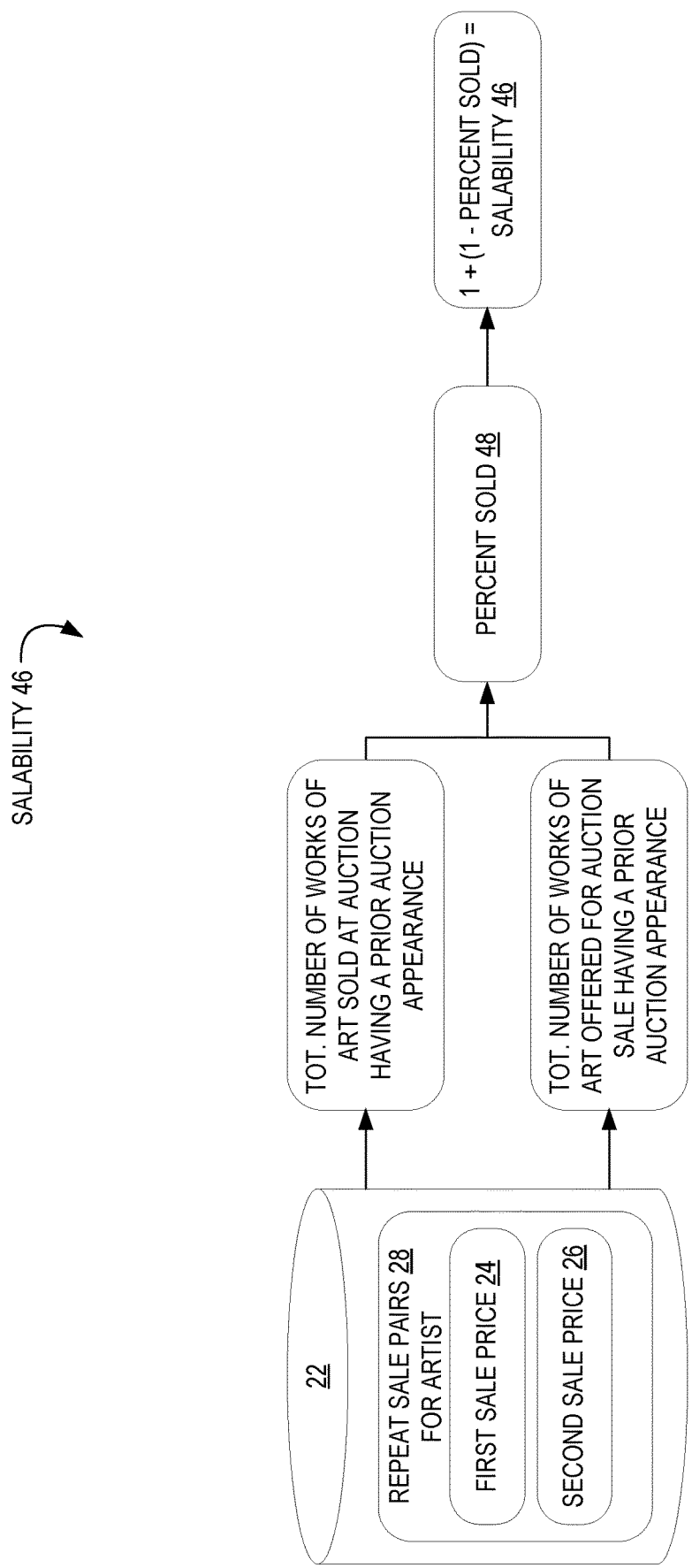
FIG. 3 shows a flowchart of an algorithm for calculating salability implemented by the estimator program of the system of FIG. 1.

FIG. 3 shows an example implementation of determining salability 46 via the art investment estimation system 12. As shown in FIG. 3, the processor 16 may be configured to determine a total number of works of art sold at auction having a prior auction appearance for the specified artist. The processor 16 may also be configured to determine a total number of works of art offered for auction sale having a prior auction appearance for the artist. By dividing the total number of works of art sold at auction by the total number of works of art offered for auction sale having a prior auction appearance for the artist, a percent sold 48 may be determined at the processor 16. Following this calculation, the processor 16 may be configured to subtract the percent sold 48 from one and add one to determine the salability 46, as shown in FIG. 3. It will be appreciated that salability 46 according to this example implementation may include a low value of 1 and a high value of 2. It will be further appreciated that a higher percentage sold yields a lower value for the salability 46, which may be advantageous for investors considering illiquid assets.

Figure 4:
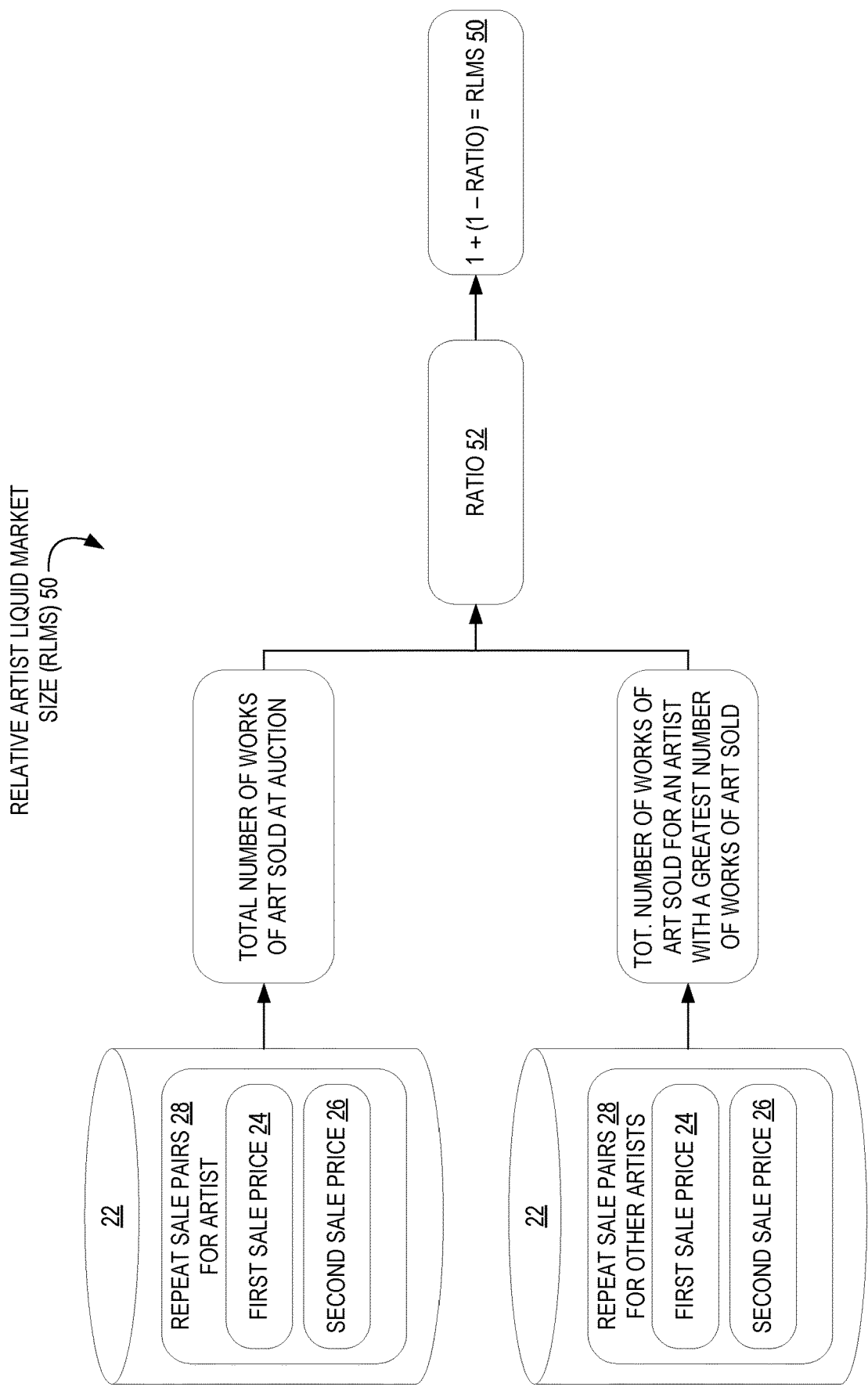
FIG. 4 shows a flowchart of an algorithm for calculating relative artist liquid market size implemented by the estimator program of the system of FIG. 1.

FIG. 4 illustrates an example implementation of determining RLMS 50 in the art investment estimation system 12. For the determination of RLMS 50, the processor 16 may be configured to determine a total number of works of art sold at auction for the specified artist. The processor 16 may be configured to also determine a total number of works of art sold at auction for an artist with a greatest number of works of art sold at auction in the database 22. By dividing the total number of works of art sold at auction for the specified artist by the total number of works of art sold at auction for the artist with the greatest number of works of art sold at auction, a ratio 52 may be determined. The processor 16 may be configured to subtract the ratio 52 from one and add one to determine the RLMS 50. As with the salability 46, RLMS 50 according to this example implementation also has a low value of 1 and a high value of 2. A value of RLMS 50 closer to 1 may be considered a positive factor for potential investors. With respect to market saturation, a low value of RLMS 50 may represent a reduced market saturation and thus an advantageous aspect with respect to investors.

Figure 5:
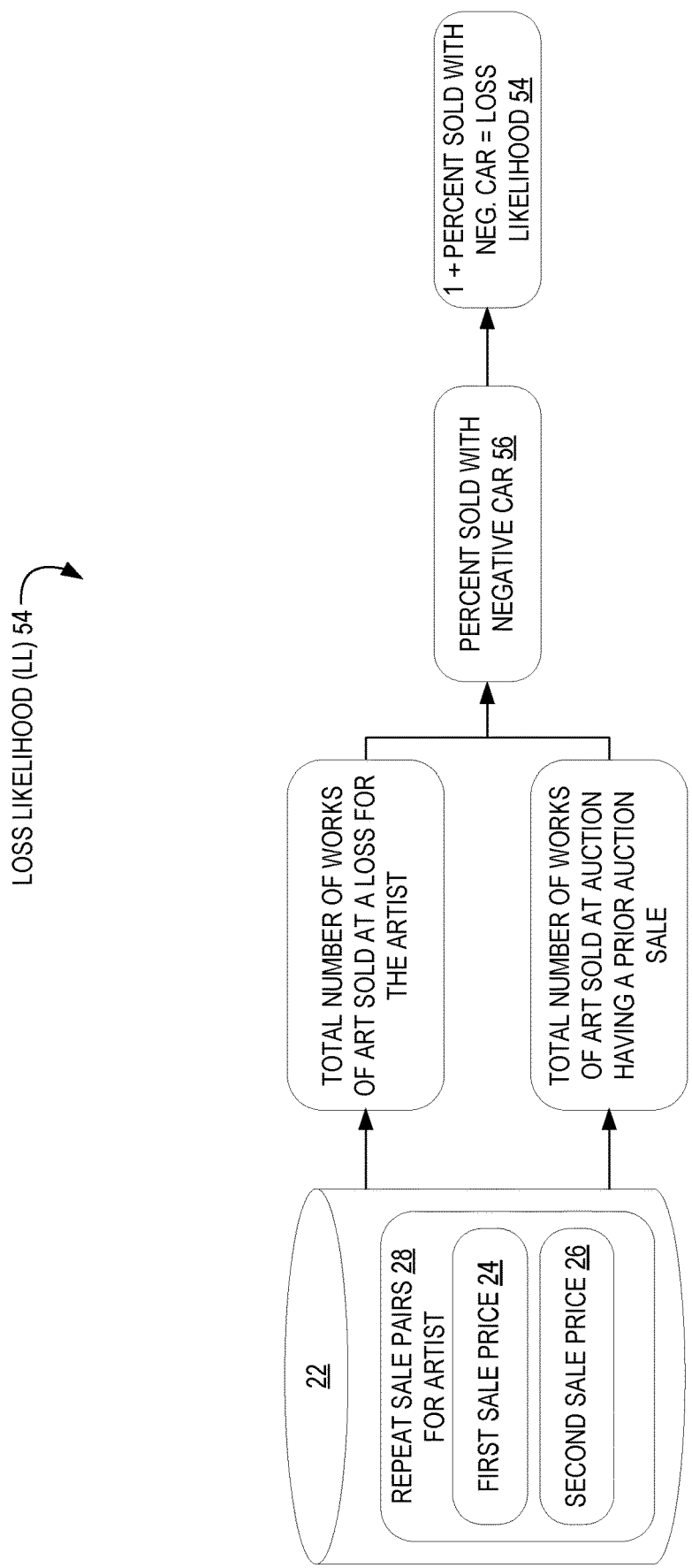
FIG. 5 shows a flowchart of an algorithm for calculating loss likelihood implemented by the estimator program of the system of FIG. 1.

FIG. 5 shows an example implementation of determining LL 54 via the art investment estimation system 12. The processor 16 may be configured to determine a total number of works of art sold at a loss for the specified artist from the database 22. The processor 16 may also be configured to determine a total number of works of art sold at auction having a prior auction sale for the specified artist. Dividing the total number of works of art sold at a loss for the specified artist by the total number of works of art sold at auction having a prior auction sale yields a percent sold with negative CAR 56. The processor 16 may be configured to add one to the percent sold with negative CAR 56 to determine the artist LL 54. Again, according to this example implementation artist LL 54 has a low value of 1 and a high value of 2. It will be appreciated that a lower percent sold with negative CAR 56 yields a lower artist LL 54, which a potential investor may consider more favorably than a higher artist LL 54.

Returning to FIG. 1, as indicated above, a user may input user input 60 via GUI 58 and the processor 16 may be configured to receive the user input 60 at the computing device after it is forwarded from the client device 14A to the computing device 14. The user input 60 may include a specific artist 60A for whom the one or more investment value variables 30 discussed above may be determined. The user input 60 also may include weights 60C, which may specify user designated weights 62 for the one or more investment value variables 30 for the specified artist, as may be input by the slider controls illustrated in FIG. 6, discussed below. Alternatively, the weights 60C may specify predetermined weights 86, as also may be inputted via the Use Predetermined Weights option of the AIP tool 58A illustrated in FIG. 6, discussed below. The processor 16 may be configured to determine, from the designated weights 62 and the one or more investment value variables 30, an AIP value 64 for the specified artist. As output, the processor 16 may be configured to, at the GUI 58, display to the user the AIP value 64. It will be appreciated that the designated weights 62 may represent the relative value that the user places on each investment value variable 30. Thus, one potential advantage of this implementation is that a user may customize the AIP value 64 of the art investment estimation system 12 according to the individual preferences of the user. Furthermore, the user may alter the user input 60 for the designated weights 62 to compare different AIP values 64 as dependent on the relative weight of each of the investment value variables 30.

Figure 6:
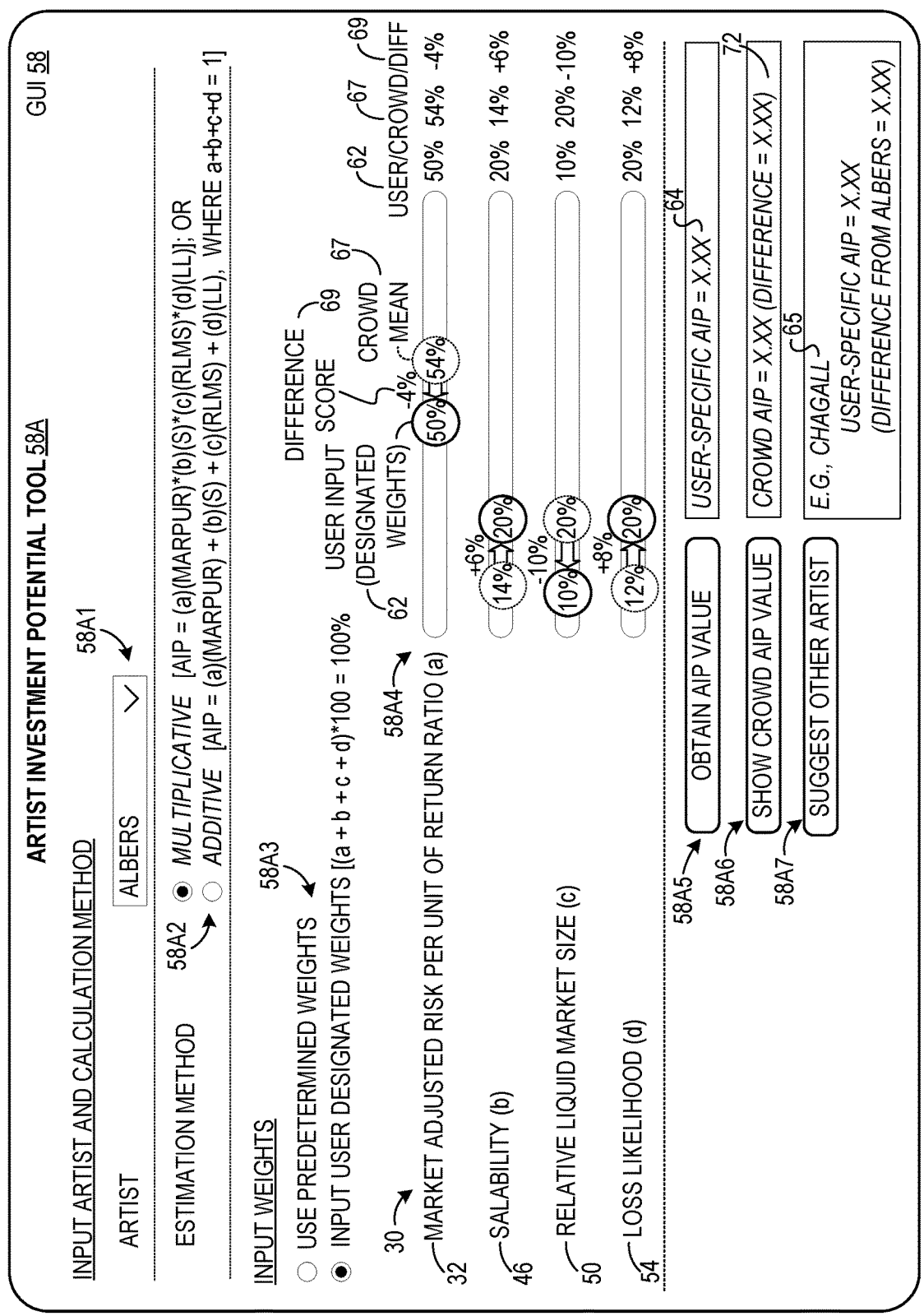
FIG. 6 shows an example implementation of a graphical user interface displaying an artist investment potential (AIP) tool that may be used, in combination with the estimator program of FIG. 1, to determine artist investment potential.

FIG. 6 shows an example implementation of artist investment potential tool 58A of GUI 58 for determining the user-specific AIP value 64 with the art investment estimation system 12 according to one example implementation. AIP tool 58A includes an artist selector 58A1 by which a user may select an artist, an estimation method selector 58A2 by which a user may choose between a plurality of estimation methods, a weight type selector 58A3 by which a user may choose between user designated weights and predetermined weights to be applied in the estimation method, and a user-designated weight input mechanism 58A4 by which a user may input specific values for the user designated weights 62 for investment value variables 30. As mentioned above, the weights represent behavioral factors of the user, since reflect each user's behavioral approach to investing. By considering the weights, the formulaic model presented herein is capable of outputting a user-specific artists investment potential value that is tuned for the specific behavioral factors of the user.

With regard to the estimation method, as described above the values of salability 46, RLMS 50, and artist LL 54 according to one example implementation range between 1 and 2. While MARPUR 32 may vary outside of this range, the value ranges of each of these investment value variables 30 may be similar in order that no one investment value variable 30 dominates the influence of the others. To determine the AIP value 64 according to the depicted multiplicative estimation method, multiplication of the one or more investment value variables 30 and the designated weights may be executed, and the one or more investment value variables 30 may include the MARPUR 32, salability 46, RLMS 50, and artist LL 54. Alternatively, according to the depicted additive estimation method the AIP value 64 may be determined from a sum of the one or more investment value variables 30 each multiplied by a respective designated weight 62, where the one or more investment value variables 30 may include the MARPUR 32, salability (S) 46, RLMS 50, and artist LL 54. For each of these respective cases, the equations are as follows.

AIP=(*a*)(MARPUR)\*(*b*)(S)\*(*c*)(RLMS)\*(*d*)(LL)

AIP=(*a*)(MARPUR)+(*b*)(S)+(*c*)(RLMS)+(*d*)(LL)

In each case, a+b+c+d=1, or stated alternatively, (a+b+c+d) \*100=100%. In the case of addition, the terms for S, RLMS, and LL may outweigh the term for MARPUR, and thus a negative MARPUR value representing a negative relative market performance may not be readily apparent from the resultant AIP value 64. As such, the multiplicative approach may be preferable. In the case of multiplication, an artist with a small positive value may be apparent as having a high investment potential. Furthermore, a positive value may not be possible in the multiplicative case for an artist that underperforms in the market, as reflected in the MARPUR 32.

In the implementation of FIG. 6, a user may input a specified artist (e.g., Albers in the example shown) that is included in the database 22 using artist selector 58A1 and choose an estimation method using estimation selector 58A2. The user may choose between using predetermined weights stored by the system, or using user-designated weights using weight type selector 58A3. The designated weights 62 may be selected by the user according to the user's preferences, using user-designated weight input mechanism 58A4, which in the depicted figure includes four sliders that the user may manipulate. In the example of FIG. 6, a user selects the weight for MARPUR 32 as 50%, the weight for salability 46 as 20%, the weight for RLMS 50 as 10%, and the weight for LL 54 as 20%. With these inputs, the user may then select a selector option 58A5 to obtain the AIP value 64, which is displayed in the text field next to the selector as a user-specific AIP value 64. The value is said to be user-specific because it is based upon values for the designated weights 62 inputted by the user. AIP tool 58A is also configured to show a crowd mean 67 for each of the investment value variables 30. The crowd mean 67 is computed by examining the overall user input from all users of art investment estimation system 12 for that specific variable, normalized such that the total sum of the crowd means for each investment value variable total 100%. A difference score 72 may be computed between the crowd mean 67 and user input designated weights 62. Viewing these, a user may evaluate how far from the crowd mean 67 the user-specific designated weights 62 are, and may make adjustments if desired. A show crowd AIP value selector 58A6 is provided to enable a user to select to display a crowd AIP value 67A that is computed based on the crowd means 67.

It will be appreciated that other investment value variables 30 may be implemented into the multiplicative, additive, or other estimation method that determines the AIP value 64. In one example, a relative artist risk (RAR) may be included, which may be determined once the standard deviation of the CARs of each artist in the database 22 is calculated. The lowest standard deviation of all the artists, which represents the lowest risk artist, may be divided by the standard deviation for the specified artist and placed into the following equation.

$$RAR = 1 + \left(1 - \left(\frac{\text{LOWEST RISK ARTIST}}{\text{SPECIFIED ARTIST RISK}}\right)\right)$$

This determination of RAR will, similarly to other investment value variables discussed above, include a low value of 1 and a high value of 2. An additional investment value variable 30 that may be considered is owner expectation (OE). OE may be determined from a calculation of CAR using a sale price of a work of art and the auction house current low estimate of the work of art. The mean of such CARs for the specified artist may be divided by the highest mean of the CARs calculated in this way for an artist in the database 22. Adding one to the result may yield a measure of OE appropriate for inclusion in the AIP value 64 determination. By using the mean the CARs calculated with respect to the auction house current low estimate of a work of art may yield a representation of whether an owner has a return expectation of a work of art that is high relative to other artists. Overly high expectations may limit a desirability for investment since overpayment at purchase may result in lower future returns. Thus, OE may be another type of measure for the AIP value 64. Variations of these investment value variables 30 or other investment value variables 30 may be included in the determination of AIP value 64 as appropriate to preferences in the determination of the AIP value 64 and weightings of different factors that may affect how a specified artist is evaluated and/or ranked.

Example formulas for the multiplicative and additive estimation methods follow.

AIP=(*a*)(MARPUR)\*(*b*)(S)\*(*c*)(RLMS)\*(*d*)(LL)\*(*e*)(RAR);

AIP=(*a*)(MARPUR)+(*b*)(S)+(*c*)(RLMS)+(*d*)(LL)+(*e*)(RAR);

AIP=(*a*)(MARPUR)\*(*b*)(S)\*(*c*)(RLMS)\*(*d*)(LL)\*(*e*)(OE); or

AIP=(*a*)(MARPUR)+(*b*)(S)+(*c*)(RLMS)+(*d*)(LL)+(*e*)(OE),

WHERE a+b+c+d+e=1.

AIP=(*a*)(MARPUR)\*(*b*)(S)\*(*c*)(RLMS)\*(*d*)(LL)\*(*e*)(RAR)\*(*f*)(OE); or

AIP=(*a*)(MARPUR)+(*b*)(S)+(*c*)(RLMS)+(*d*)(LL)+(*e*)(RAR)+(*e*)(OE),

WHERE a+b+c+d+e+f=1.

A potential advantage of the art investment estimation system 12 is that a user may compare and contrast multiple artists from the database 22 when considering works of art as potential investments. To aid in this purpose, a suggest other artist selector 58A7 is provided, which upon selection by a user causes the system 12 to display one or more other suggested artists 65 (e.g., Chagall in the example shown) with user-specific AIP values that are higher for the user-specific AIP value 64 for the user specified artist chosen via artist selector 58A1, and difference from the user-specified artist AIP may be displayed (e.g., Difference From Albers in the example shown). In this way, the user may be guided to make investments in other artists that have higher potential for the weights that they entered via the AIP tool 58A. Put another way, the processor 16 may be further configured to receive, at the AIP tool 58A of the GUI 58, designated weights 62 for one or more of a plurality of artists and determine, from the designated weights 62 of the one or more of the plurality of artists, one or more artists from the database 22 without designated weights 62 (i.e., other artists not selected by the artist selector 58A1 of the AIP tool 58A) having a maximum artist investment potential value with the same weights as the designated weights 62. This may be accomplished, as discussed above, by selection of the suggest other artist selector 58A7 in FIG. 6. A potential advantage of this configuration is that if the specified artist of the user does not have a high investment potential given the user's preferred weights, an artist may be suggested by the art investment estimation system 12 that has a better investment potential with the weights the user has input. Although only one other suggested artist 65 (Chagall) is shown in the example of FIG. 6, in another implementation the art investment estimation system 12 may be configured to output a list of artists that includes the specified artist of the user, the list of artists showing a plurality of other artists with similar AIP values 64 as the specified artist entered via the artist selector 58A1, given the designated weights 62 the user has input. The list of artists may alternatively show a range of artists with more widely varying AIP values 64 to demonstrate the relative placement of the specified artist in the list.

Returning to FIG. 1, as explanation of how the crowd inputs are received to compute the crowd mean and crowd AIP values discussed above, the computing device 14, functioning as a server of the art investment estimation system 12, may further be configured to store input from one or more users of other client devices 14B. In this configuration, a plurality of users may be utilizing the art investment estimation system 12, who collectively form the crowd referred to above. Data input from the plurality of users may be stored on the server. The processor 16 may be further configured to receive, from the server, designated weights of a plurality of users for a plurality of artists, referred to as crowd weights 68, in the database 22 and store the crowd weights 68 in the non-volatile memory. In this configuration, it may be possible to track the preferences of other users with respect to the artists in the database 22. The processor 16 may be configured to determine one or more averaged values and/or variability 70 of the crowd weights 68 for each artist in the database 22. By analyzing the data input of the plurality of users, it may be possible to identify trends in the interest of users in artists' investment potential. The processor 16 may be configured to determine, for the designated weights 62 of at least one user, the difference score 72 representing similarity of the designated weights 62 of the at least one user compared to the one or more averaged values and/or variability 70 of the crowd weights 68. The difference score 72 may serve as a report to the at least one user that compares trends in other users' investment preferences with the interests of the at least one user and the designated weights 62 that the at least one user employs. Thus, a potential advantage of the configuration is measurement of interest and preferences in investment potential of artists across a plurality of users. The crowd AIP value 67A may be computed based on the crowd mean 67 values for the crowd weights 68, as described above. In this way, the system 12 may be configured to compute the difference scores 72 and crowd AIP values 67A.

Turning to FIG. 7, an example of the preferred artist investment potential tool 58B of GUI 58 is illustrated, which includes artist selector 58B1, AIP value range selector 58B2, and an obtain optimized weights selector 58B3. The processor 16 may be further configured to receive, from the user, one or more artist names (e.g., Wool as shown) at the GUI 58 for the art investment estimation system 12, for example via the artist selector 58B1, which may be a drop down selector as depicted, a text entry field, or other input mechanism. The processor 16 may be configured to receive preferences of the user for a preferred range of the artist investment potential value 64, for example via the AIP value range selector 58B2, which may be a drop down selector configured with ranges as shown in FIG. 7, a text input field or other suitable input mechanism. For each of the one or more artist names, the processor 16 may be configured to determine whether each artist is included in the database 22, and for the artists included in the database 22, the processor 16 may be configured to determine optimized weights 62A for the one or more investment value variables 30 to minimize a difference between the AIP value 64 for that artist and a center value of the preferred range of the AIP value 64 of the user entered via the AIP value range selector 58B2 of the GUI 58. In this configuration, by selecting optimized weights selector 58B3 the user may receive an output of optimized weights 62A that place the specified artist as close to the center of the AIP value range entered by the user, as possible. It will be appreciated that the AIP value 64 computed based on the determined optimized weights 62A will not always lie at the center of the designated range, and in fact may be within or outside the designated range of AIP values. Thus, the processor 16 may be configured to, at the GUI 58, display the determined optimized weights 62A and a message 71 indicating that the determined optimized weights are within (i.e., produce an AIP value within) the designated range entered via AIP value range selector 58B2 or a message 71 indicating that the resulting AIP value 64 is a certain amount above or below the designated range may be shown. Both messages 71 are shown for illustration, although only the applicable message 71 would be shown during use. Thus, if applicable, the difference may be displayed between the AIP value 64 resulting from the determined weights and the high or low bound (or alternatively center value) of the designated range of the of the AIP value 64 that the user entered. A potential advantage of this configuration is that the user may be presented with weights for the investment value variables 30 that are optimized to achieve an AIP value within a designated range, which may later be adjusted according to the user's preferences.

Turning to FIG. 8, an example illiquid AIP tool 58C of GUI 58 is shown. The illiquid AIP tool 58C may be used to estimate the artist investment potential of an illiquid artist for whom sufficient sales pair data for works of art by the artist are not available, by using sales pair data from a category or group to which the artist belongs as a proxy. Via illiquid AIP tool 58C, the processor 16 may be further configured to receive a user selection of an illiquid artist 74 (Artist A as shown) via illiquid artist selector 58C1. The set of illiquid artists from which Artist A is selectable via the illiquid artist selector 58C1 may be determined by the processor 16 by examining all artists included in the database 22, and determine illiquid artists according to a predetermined threshold 76 of repeat sale pairs per year. According to the example shown in FIG. 8, the predetermined threshold 76 may be fewer than two repeat auction sales per year. Alternatively, a different number may be chosen for the threshold, or the threshold may be expressed as a relative percentage of sales per year as compared to other artists in the database 22, such as artists in the bottom 2% in terms of liquidity. The processor 16 may be configured to assign each illiquid artist 74 to one or more groups 78, the one or more groups 78 determined according to at least one predetermined commonality, such as a genre or category of artist. The genre or category may be defined by an artistic style, era, or geographic origin of the artist, for example. Each of the groups 78 is selectable via a category selector 58C2, which also allows selection of all illiquid pairs, i.e., all groups. In the example of FIG. 8, the groups 78 include at least American, British, Impressionist and Modern, Latin American, Old Master, and Post-War and Contemporary. The processor 16 may be configured to, from available repeat sale pairs data for the illiquid artists 74 in the database 22, determine a median compound annual return 80 from the first sale price 24, first sale price date 24A, second sale price 26, and second sale price date 26A of each of the repeat sale pairs 28 for the one or more groups 78. The processor 16 may be configured to receive a user request for an illiquid artist investment potential value 82 for a respective illiquid artist via an illiquid artist AIP value selector 58C3, and at the GUI 58, display to the user the median compound annual return 80 for the one or more groups 78 to which the illiquid artist 74 has been assigned. In the example of FIG. 8, the user may select an artist that is an illiquid artist 74 or a group 78 to which the artist belongs, if known. If one or more groups 78 are not specified by the user, the processor 16 may determine to which group 78 the artist 74 selected by the user belongs and return the median CAR 80 for the artist/ group 78 as the illiquid artist AIP value 82. It will be appreciated that use of the median CAR 80 rather than the mean CAR may be advantageous in that extreme values may not strongly affect the illiquid artist AIP value 82. A potential advantage of this configuration is that for illiquid artists for whom little repeat sales pair data may exist an AIP value may still be determined.

Returning to FIG. 1, it will be appreciated that art investment estimation system 12 may be configured to enable a user to keep track of the investment potential of an art collection. Thus, the processor 16 may be configured to receive, at the GUI 58, input from the user indicating a collection 84 of artwork of artists and store the collection 84 in the memory. It will be appreciated that this configuration may be advantageous for users who own a plurality of works of art as investments and who would like to track the value of the works of art in the collection 84. The processor 16 may be configured to determine weights for the one or more investment value variables 30 from at least one of the designated weights 62 and predetermined weights 86. In this configuration, the user may prefer to employ designated weights 62 or may utilize predetermined weights 86 in the art investment estimation system 12. For each artist of artwork included in the collection 84 that is also in the database 22, the processor 16 may be configured to determine the AIP value 64 from the one or more investment value variables 30 and the determined weights. At a predetermined interval that may be set by the user, the processor 16 may be configured to determine updated AIP values 64 based on updates to the database 22 and output the updated AIP values 64 to the user. In this manner, a user may receive regular reports on the current investment value of works of art in the collection 84.

While a user of the art investment estimation system 12 may be investigating the investment potential of various artists, the potential value of a particular work of art may also be of interest to the user, which may be estimated from the AIP. FIG. 9 shows an example of a price prediction tool 58D of GUI 58 that is configured to calculate a price prediction 88 of a work of art, in one implementation of the art investment estimation system 12. A price prediction 88 may be computed, for example, by compounding the first sale price 24 (i.e., acquisition price) at a chosen return rate for the number of years the work of art is held. The equation may be $$P = A(1+r)^n$$

where P is the price prediction 88, A is the first sale price 24 (i.e., acquisition price), r is the return rate and n is the number of years the work of art is held, which may be computed by subtracting the first sale date from the second sale date and expressing the result in years. Choosing an appropriate return rate r may be an option for the user. It will be appreciated that various statistical assumptions may be made in the choice of the return rate r as discussed below.

At the GUI 58, a user may enter the title of a work of art of interest via a title selector 58D1, as well as select the artist via an artist selector 58D2. The user may choose a calculation metric by which the price prediction 88 may be made via a calculation metric selector 58D3, which may determine the return rate r. The calculation metric may be a CAR for works of art by the artist purchased in the previous 5 years or, in another implementation, prior to last 5 years. Alternatively, the middle 60% of all CAR values for a distribution of the CAR values of the artist may be selected; in variations of this option, the top 80% or bottom 80% of the distribution may also be chosen. In another example, the user may select one or more CAR quintiles (e.g., 0-20%, 20-40%, 40-60%, 60-80%, and 80-100%) to base the calculation upon. An additional option for the calculation metric may be a user specified value. That is, the user may enter a specified growth factor, such as 7%. A performance measure may also be selected via a performance measure selector 58D4 by the user, which determines the return rate r and that may be drawn from, for example, either a mean or a median CAR. A first sale price 26 may be entered by the user via a first sale price selector 58D5, and the year of purchase of the work of art may be entered by a year of purchase selector 58D6. Another option that may be entered as a factor is the insurance appraisal price and the year of appraisal; in this case the user may select for the appraisal information as the data to be included in the equation for price prediction 86, via an insurance appraisal price selector 58D8 and year of appraisal selector 58D9. A calculation method selector 58D10 is provided to allow the user to specify whether to calculate the predicted price based on the entered purchase information, appraisal information, or both. By selecting the price prediction selector 58D11, the processor 16 is configured to compute and display the predicted price 86 based on the entered values for the price prediction parameters.

A potential advantage of the price prediction 88 is as an alternative estimate to an auction house estimate, which may be of interest to the user potentially purchasing a work or art that has been evaluated. As such, the ability to create an independent estimate of the work of art may be advantageous. It will be appreciated that, as described above for when computing device 14 is configured as a server that communicates with a variety of other client devices 14B, data from a plurality of users may be combined to potentially increase the predictive power of the price prediction 88; comparisons between predictions of users may also be made, and pre-sale predictions may be compared with post-sale outcomes on a scale of many users.

FIG. 10 shows an example implementation of a graphical user interface displaying a collection curation tool GUI 58E of the GUI 58 of art investment estimation system 12 of FIG. 1. The collection curation tool GUI 58E enables a user to input collection parameters, user-specific weights for the investing behavioral variables discussed above, and based upon this input, the estimator program 17 is configured to determine and display on the collection curation tool GUI 58E sell suggestions and/or purchase suggestions for divesting and/or acquiring works of art. Collection curation tool GUI 58E includes a collection input selector 58E1 by which a user may input assets in one or more of the user's art collections. The collection input selector 58E1 includes a drop-down selector 58E1A by which the user may select among a plurality of user collections, with the selected user collection serving as the basis for the computation of the sell and purchase suggestions. An edit button 58E1B is provided by which the user may open a pop-up menu with options for adding and deleting assets from the selected collection, for example. Collection curation tool GUI 58E includes a weights selector 58E2, which includes an edit button 58E2A that causes a pop-up menu to be displayed, by which the user may edit the specific weights for each of the behavioral variables displayed therein, and which may be similar to the slider interface shown in FIG. 6.

Collection curation tool GUI 58E also includes a transaction price range selector 58E3 with an input field 58E3A by which a user my manually input a desired price range within which the estimated price for the works of art that are presented in the sell suggestions and purchase suggestions should fall. Alternatively or in addition to the input field 58E3A, the transaction price range selector 58E3 may include an estimate button 58E3B, which causes the estimator program 17 to compute and display an estimated transaction price range based upon the estimated prices of the assets in the user's selected collection. For example, a standard deviation from the mean estimated price, or alternatively the middle 40% or middle 20% of the estimated prices of the assets in the user's selected collection may be computed as the estimated transaction price range. The collection curation tool GUI 58E further includes an artist group selector 58E4, that enables the user to select one or more, or possibly all, artist groups for inclusion in the sell and purchase suggestions. It will be appreciated that the artist groups are categories of artist genres, similar to that which can be selected by selector 58C2 in FIG. 8. In the depicted illustration of FIG. 10, all artist groups are selected, so none will be filtered out of the sell and purchase suggestions.

Collection curation tool GUI 58E further includes a sell suggestion selector 58E5 and a purchase selection selector 58E6. Sell suggestion selector 58E5 includes a calculate button 58E5A, which upon selection causes display pane 58E5B to display a ranked list of assets (i.e., works of art) computed by the estimator program 17 as candidates for sale, from among the assets in the user's selected collection indicated in collection selector 58E1. Typically, the list is ranked by the artist investment potential (lowest to highest) of the artist of the work of art as a primary ranking criterion. Alternatively, or as a secondary ranking criterion (i.e., used to rank assets with the same value of the primary ranking criterion), the assets may be ranked based on distance from a median value in the transaction price range, and/or an alphabetical ranking of the asset name, for example. The list is filtered by the transaction price range and artist group selected via selectors 58E3 and 58E4, and computed based on the user-specific weights inputted and displayed in weight selector 58E2. Using the sell suggestion selector 58E5, the user can quickly be informed of assists within the transaction price range and genre that the user desires to sell, and that have the lowest artist investment potential values.

Purchase suggestion selector 58E6 includes a calculate button 58E6A, which upon selection causes display pane 58E6B to display a ranked list of assets (i.e., works of art) computed by the estimator program 17 as candidates for purchase, from among the works of art in database 22 that have been indicated as available for purchase, for example through notices of upcoming auctions, gallery sales listings, or other manner. Typically, the list is ranked by the artist investment potential (highest to lowest) of the artist of the work of art as a primary ranking criterion. Alternatively, or as a secondary ranking criterion (i.e., used to rank assets with the same value of the primary ranking criterion), the assets may be ranked based on distance from a median value in the transaction price range, and/or an alphabetical ranking of the asset name, for example. The list is filtered by the transaction price range and artist group selected via selectors 58E3 and 58E4, and computed based on the user-specific weights inputted and displayed in weight selector 58E2. Using the purchase suggestion selector 58E6, the user can quickly be informed of assts within the transaction price range and genre that the user desires to sell, and that have the highest artist investment potential values.

In some embodiments, a separate transaction price range selector 58E3 and artist group selector 58E4 may be provided for each of the sell suggestion selector 58E5 and the purchase suggestion selector 58E6, in case the user desires to input different values for a sale and purchase, which may be useful if the user desires to put additional cash into the collection or take cash out of the collection, for example.

Figure 11:
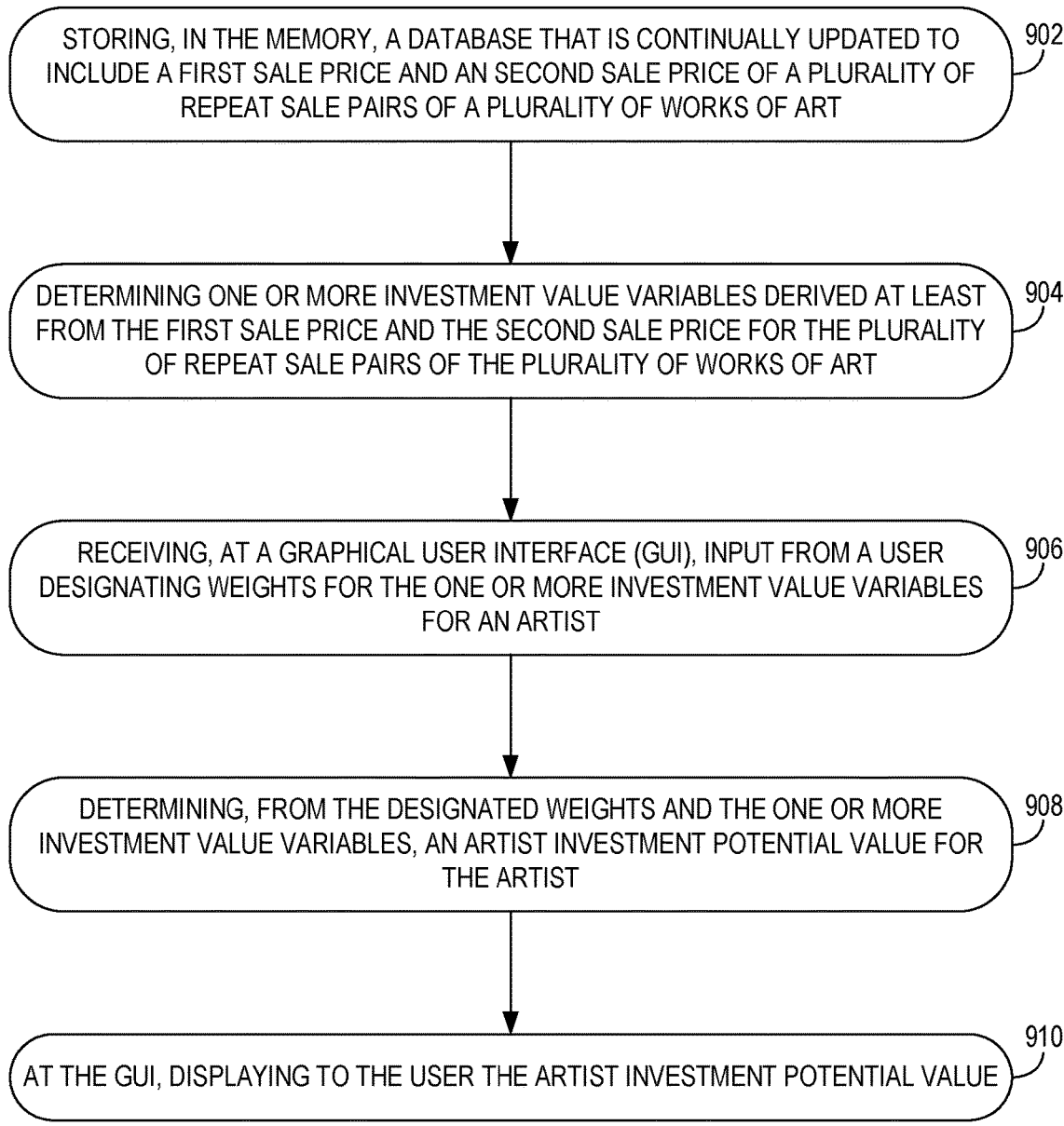
FIG. 11 is a flowchart of a method for estimating an artist investment potential value.

FIG. 11 shows a flowchart of a method 900 for use with a computing device 14 of the art investment estimation system 12 including a processor 16 and associated memory, the processor 16 being configured to execute one or more programs stored in the memory. The following description of method 900 is provided with reference to the computing systems described above. It will be appreciated that method 900 may also be performed in other contexts with other suitable components.

With reference to FIG. 11, the method 900 at 902 may include, at the processor 16, storing, in the memory, a database 22 that may be continually updated to include a first sale price 24 and an second sale price 26 of a plurality of repeat sale pairs 28 of a plurality of works of art. At 904, the method 900 may include determining one or more investment value variables 30 that may be derived at least from the first sale price 24 and the second sale price 26 for the plurality of repeat sale pairs 28 of the plurality of works of art. As discussed above, in one example implementation a user may input a specified artist that may be included in the database 22 at a graphical user interface (GUI) 58 of the art investment estimation system 12. The method 900 at 906 may include receiving, at the GUI 58, input from a user designating weights 62 for the one or more investment value variables 30 for an artist. At 908, the method 900 may include determining, from the designated weights 62 and the one or more investment value variables 30, an artist investment potential (AIP) value 64 for the artist. At 910, the method 900 may include, at the GUI 58, displaying to the user the AIP value 64.

As discussed above, the one or more investment value variables 30 may include a market adjusted risk per unit of return ratio (MARPUR) 32. In order to determine MARPUR 32, the method 900 may include, at the processor 16, determining a first compound annual return (CAR) 34 that is for each work of art of the specified artist in the database 22. A second CAR 36 may be determined that is for each work of art in the database 22 for a same year sale and same year purchase as each of the works of art of the artist, as described above. Subtracting the mean of the second CARs 36 from each of the first CARs 34 yields a set of market adjusted returns 38 for the artist; the mean 40 of the set of market adjusted returns 38 may then be determined. Dividing the mean 40 of the set of market adjusted returns 38 into a standard deviation 42 of the set market adjusted returns 38 for the artist yields a coefficient of variability 44 that is the MARPUR 32.

As also discussed above, the one or more investment value variables 30 may include a salability 46. In order to determine the salability 46, the method further 900 may further include, at the processor 16, determining a total number of works of art sold at auction having a prior auction appearance for the artist, and also determining a total number of works of art offered for auction sale having a prior auction appearance for the artist. Dividing the total number of works of art sold at auction by the total number of works of art offered for auction sale having a prior auction appearance for the artist may be executed to determine a percent sold 48. Subtracting the percent sold 48 from one and adding one produces the salability 46. According to this example implementation salability 46 may include a low value of 1 and a high value of 2.

As also discussed above, the one or more investment value variables 30 may include relative artist liquid market size (RLMS) 50. In order to determine the RLMS 50, the method 900 may further include, at the processor 16, determining a total number of works of art sold at auction for the artist and determining a total number of works of art sold at auction for an artist with a greatest number of works of art sold at auction in the database 22. Dividing the total number of works of art sold at auction by the total number of works of art sold at auction for the artist with the greatest number of works of art sold at auction may be executed to determine a ratio 52. Subtracting the ratio 52 from one and adding one yields the RLMS 50. As with the salability 46, RLMS 50 according to this example implementation may also have a low value of 1 and a high value of 2.

As also discussed above, the one or more investment value variables 30 may include artist loss likelihood (LL) 54. In order to determine artist LL 54, the method 900 may further include, at the processor 16, determining a total number of works of art sold at a loss for the artist and determining a total number of works of art sold at auction having a prior auction sale for the artist. Dividing the total number of works of art sold at a loss by the total number of works of art sold at auction having a prior auction sale produces a percent sold with negative compound annual return 56. Adding one to the percent sold with negative compound annual return 56 yields the artist LL 54. Similarly, to salability 46 and RLMS 50, in this example implementation artist LL 54 may have a low value of 1 and a high value of 2.

The AIP value 64 may be determined from a multiplication of the one or more investment value variables 30 and the designated weights 62; the one or more investment value variables 30 may include MARPUR 32, salability 46, RLMS 50, and/or artist LL 54. As discussed above, an alternative method may include addition rather than multiplication. An artist with a small positive value for the AIP value 64 may be thus indicated as having a higher investment potential than an artist with a larger AIP value 64. In the multiplicative case, a negative value may indicate an artist that underperforms in the market, as reflected in the MARPUR 32.

The method 900 may further include, at the processor 16, receiving, from the user, one or more artist names and receiving preferences of the user for a preferred range of the AIP value 64 for each of the one or more artist names. Once it has been determined at the processor 16 whether each artist is included in the database 22, for the artists included in the database 22, weights for the one or more investment value variables 30 may be determined to minimize a difference between the AIP value 64 and the preferred range of the AIP value of the user. Displaying the determined weights and the difference may be executed at the GUI 58.

As also described above, the processor 16 may be further configured to receive, at the GUI 58, designated weights 62 for one or more of a plurality of artists and determine, from the designated weights 62 of the one or more of the plurality of artists, one or more artists from the database 22 without designated weights 62 having a maximum artist investment potential value with the same weights as the designated weights 62.

As further discussed above, the art investment estimation system 12 may include a server configured to store input from one or more users, the server being in communication with the processor 16. In this configuration, a plurality of users may be utilizing the art investment estimation system 12. Data input from the plurality of users may be stored on the server. The processor 16 may be further configured to receive, from the server, crowd weights 68 for a plurality of artists in the database 22 and store the crowd weights 68 in the memory. In this configuration, it may be possible to track the preferences of other users with respect to the artists in the database 22. The processor 16 may be configured to determine one or more averaged values and/or variability 70 of the crowd weights 68 for each artist in the database 22. By analyzing the data input of the plurality of users, it may be possible to identify trends in the interest of users in artists' investment potential. The processor 16 may be configured to determine, for the designated weights 62 of at least one user, a score 72 representing similarity of the designated weights 62 of the at least one user compared to the one or more averaged values and/or variability 70 of the crowd weights 68.

For illiquid artists, as illustrated above, the processor 16 may be further configured to, of artists included in the database 22, determine illiquid artists 74 according to a predetermined threshold 76 of repeat sale pairs per year. The predetermined threshold 76 may be, for example, fewer than two repeat auction sales per year. The processor 16 may be configured to assign each illiquid artist 74 to one or more groups 78, the one or more groups 78 determined according to at least one predetermined commonality. Groups 78 may include, for example, American, British, Impressionist and Modern, Latin American, Old Master, and Post-War and Contemporary. The processor 16 may be configured to, from available repeat sale pairs data for the illiquid artists 74 in the database 22, determine a median compound annual return 80 from the first sale price 24 and the second sale price 26 of each of the repeat sale pairs 28 for the one or more groups 78. The processor 16 may be configured to receive a user request for an illiquid artist investment potential value 82 for a respective illiquid artist, and at the GUI 58, display to the user the median compound annual return 80 for the one or more groups 78 to which the illiquid artist 74 has been assigned.

The processor 16 may be configured to receive, at the GUI 58, input from the user including a collection 84 of artists and store the collection 84 in the memory as outlined above. This configuration may be advantageous for users who own a plurality of works of art as investments and who would like to track the value of the works of art in the collection 84. The processor 16 may be configured to determine weights for the one or more investment value variables 30 from at least one of the designated weights 62 and predetermined weights 86. The user may prefer to employ designated weights 62 or may utilize predetermined weights 86 in the art investment estimation system 12. For each artist included in the collection 84 that is also in the database 22, the processor 16 may be configured to determine the AIP value 64 from the one or more investment value variables 30 and the determined weights. At a predetermined interval that may be set by the user, the processor 16 may be configured to determine updated AIP values 64 based on updates to the database 22 and output the updated AIP values 64 to the user.

As described herein, the art investment estimation system 12 may provide a user with the ability to determine an artist investment potential value 64 according to the preferences and interests of the user. It will be appreciated that the art investment estimation system 12 may be an independent estimation tool with respect to art appraisals, art auction estimates, and other tools for estimating a potential value or investment value of a work of art. By harnessing known sales data for works of art and applying novel methods, the art investment estimation system 12 may yield AIP values 64 having statistical rigor and reliability. Additionally, the art investment estimation system 12 may process data for a plurality of users to output an analysis of trends in artwork investment interest as well as data that may be relevant to collections 84 of works of art.

Figure 12:
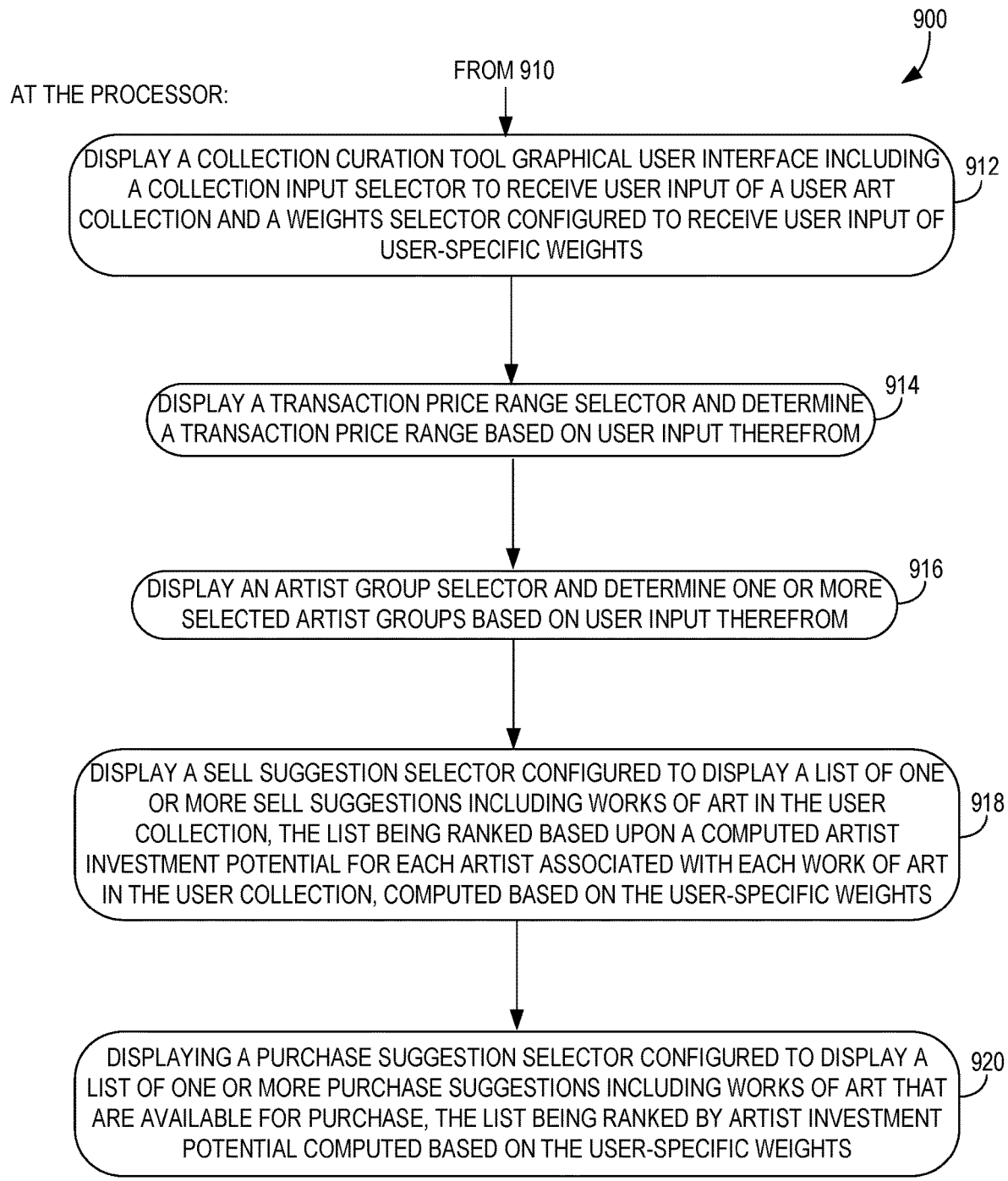
FIG. 12 is a continuation of the flowchart of FIG. 11.

As shown in FIG. 12, method 900 may further include steps that enable a user to interact with a collection curation tool such as is shown in FIG. 10, to receive suggestions for sales and purchases related to a user collection of works of art. At 912, method 900 includes displaying a collection curation tool graphical user interface including a collection input selector to receive user input of a user art collection and a weights selector configured to receive user input of user-specific weights. An example collection curation tool graphical user interface is shown at 58E and an example collection input selector is shown at 58E1 in FIG. 10. At 914, method 900 may further include displaying a transaction price range selector and determining a transaction price range based on user input therefrom. An example transaction price range selector is illustrated at 58E3 in FIG. 10. At 916, the method 900 may further include displaying an artist group selector and determining one or more selected artist groups based on user input therefrom. An example artist group selector is illustrated at 58E4 in FIG. 10. At 918, the method further includes displaying a sell suggestion selector configured to display a list of one or more sell suggestions including works of art in the user collection, the list being ranked, typically from lowest to highest, based upon a computed artist investment potential for each artist associated with each work of art in the user collection, computed based on the user-specific weights. An example sell suggestion selector is illustrated at 58E5 in FIG. 10. At 920, the method further includes displaying a purchase suggestion selector configured to display a list of one or more purchase suggestions including works of art that are available for purchase, the list being ranked, typically from highest to lowest, by artist investment potential computed based on the user-specific weights. An example sell suggestion selector is illustrated at 58E6 in FIG. 10. It will be appreciated that the sell suggestions and purchase selections displayed in steps 918 and 920 may be filtered by the transaction price range determined in step 914 and/or the selected artist group determined in step 916.

In the art investment estimation system 12, the processor 16 may be configured to determine the user-specific artist investment potential value 64 for the artist using an artificial intelligence model, as described below. Turning now to FIG. 13A, an implementation of art investment estimation system 12 is shown that utilizes machine learning techniques to train an artificial intelligence (AI) model 104 to emulate the behavior of the estimator program 17 described above, and then improve the predictions using feedback training. To achieve this, a training data set 102 may be assembled at a training computing device 14A, which includes the artwork price data 21 from database 22, as well as user inputs 60 made to estimator program 17 and corresponding results 61 computed by the estimator program in response. The training computing device 14A uses this training data 102 to train the AI model 104 to produce a trained AI model 104A. Any of the user inputs 60 and results 61 described above may be used in the training data set 102. For example, the artist 60A, estimation method 60B, and weights 60C may be used as user input 60 and the user-specific artist investment potential value 64 may be used as the result 61. The AI model 104 may be, for example, a neural network such as a recurrent convolutional neural network, as one example. The output layer of such a neural network may be configured with one node that outputs a scalar value, such as a user-specific artist investment potential value 64, for example. Alternatively, an output layer with a plurality of output nodes, such as in a classification network, may be used.

During training time, a training data pair for the AI model may be gathered from the training data 102, by selecting the user input 60 for a particular query and the result 61 produced by the estimator program 17. The user input 60 is passed as an input vector to the AI model and the result 61 is set to the output of the AI model. A training algorithm such as a backpropagation algorithm may be applied to adjust the weights of the model based on the input and output of each training data pair. In another approach, to this input vector formed by the user input, a subset of artwork price data 21 that was used by the estimation program 17 to compute the result 61 may be concatenated.

Following training at training time on the training computing device 14A, the trained AI model 104A is outputted to a run-time computing device 14B. It will be appreciated that computing devices 14, 14A, and 14B may be the same device in some implementations. At run time, the trained AI model 104A is fed user input 60 and optionally a subset of artwork price data 21 as described above, and the trained AI model 104A outputs a predicted result 106, such as a predicted user-specific artist investment potential value 64. Subsequently, a new data point may be obtained by the art investment estimation system 12, as an actual result 108 for a subsequent sale price of a work of art is newly obtained from auction records or another data source.

The predicted result 106 is then compared to the actual result 108 and the error is used in feedback training, by applying a loss function that corrects the weights in the trained AI model 104A based on the measured error between the predicted result 106 and the actual result 108. In this way, the accuracy of the trained AI model 104A can be improved over time. In some cases, the next actual result may be at a point in the future that is separated by time from the time at which the predicted result was computed. In this case, the error could be computed taking into account the different points in time, for example, by using a time-based interpolation function. Such techniques could be particularly useful in predicting values related to works of illiquid artists with infrequent sales.

Figure 13B:
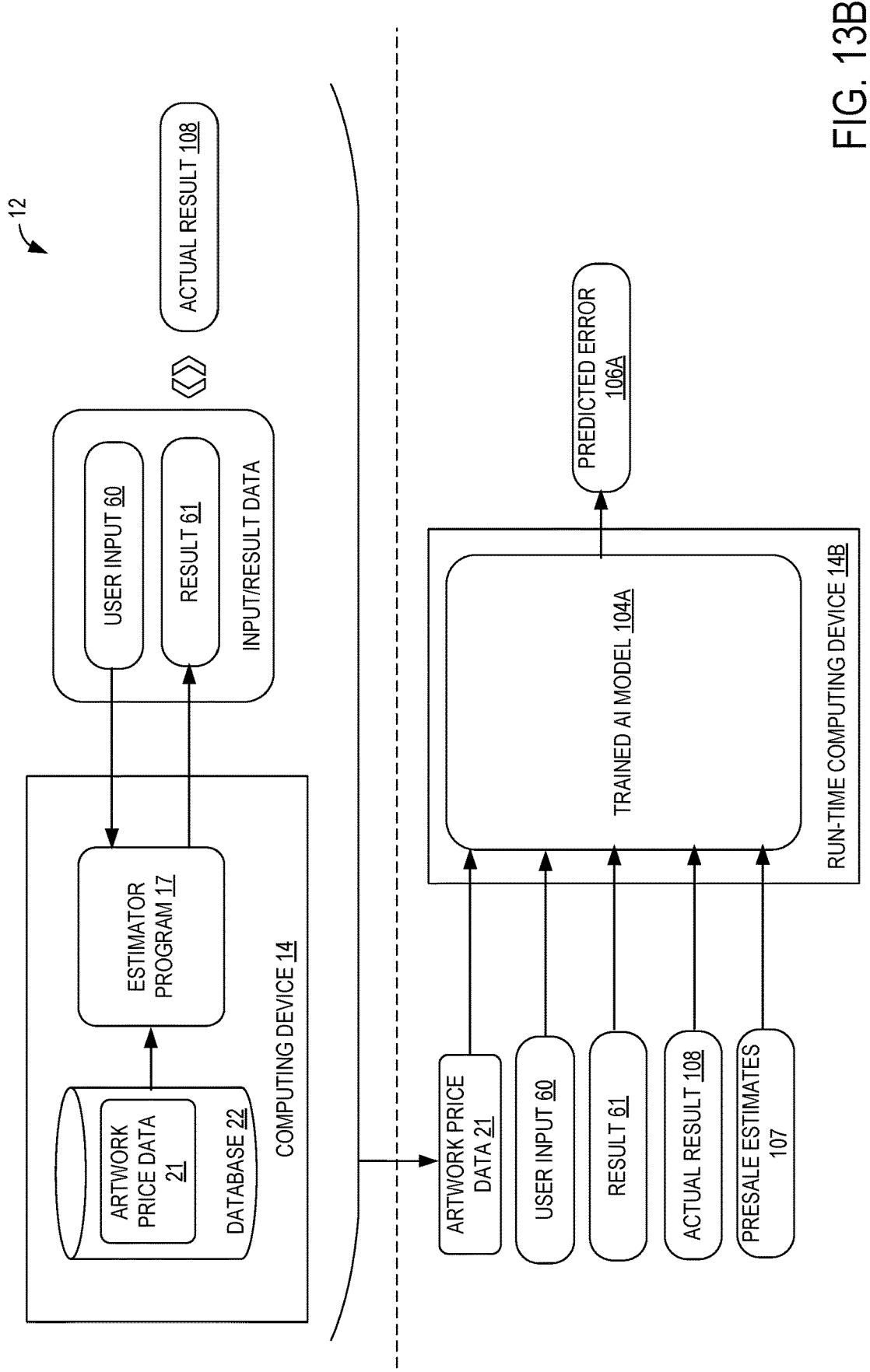

In another related approach, in the art investment estimation system 12, the artificial intelligence model has been trained on a training data set to determine an error offset between a predicted price outputted from a formulaic model and an actual price. As used herein, the formulaic model refers to the methods described above that use formulas to estimate the artist investment potential value. As illustrated in FIG. 13B, art investment estimation system 12 may be configured to output an estimate of the result 61 such as the artist investment potential for an artist or price prediction for a work of art prior to an auction or other sale event using the programmatic techniques described above in relation to FIGS. 1-12, and a trained AI model 104A that has been trained to estimate a predicted error 106A between the predicted result 61 and actual result 108 is applied. The trained AI model 104A receives, as input user input 60, the result 61 from the estimator program 61, the actual result 108, and in some embodiments a subset of artwork price data 21 and/or presale estimates 107 such as estimated sale prices, reserve prices, etc., published in auction house publications or via other data sources, prior to the auction. These presale estimates, in particular, may provide a signal that the AI model 104A can learn from to predict the predicted error 106A between the result 61 predicted by the programmatic algorithm of the estimator program 17 and the actual result 108. The predicted error 106A obtained in this manner prior to the auction itself, may inform investment decisions at the auction.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

Figure 14:
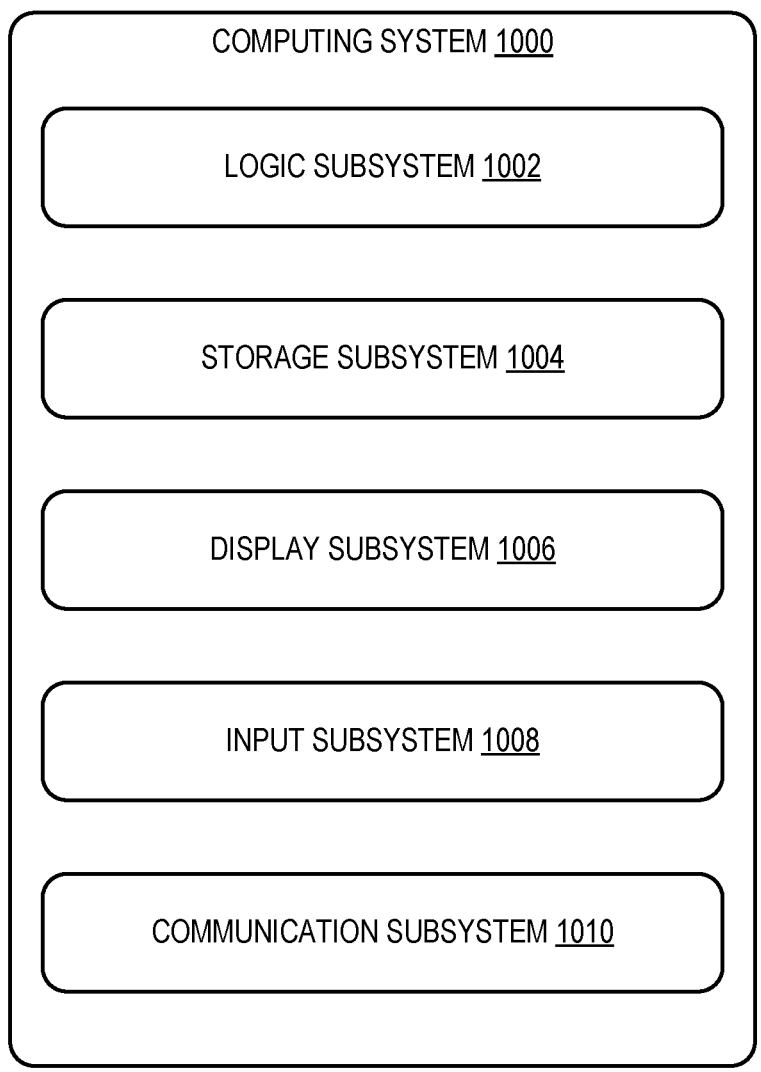
FIG. 14 is an example computing system according to an implementation of the present description that may be used to implement any of the computing devices illustrated in FIG. 1, for example.

FIG. 14 schematically shows a simplified representation of a computing system 1000 configured to provide any to all of the compute functionality described herein. Computing system 1000 may take the form of one or more virtual/augmented/mixed reality computing devices, personal computers, network-accessible server computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 14.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 1002 and the storage subsystem 1004 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI) including holographic virtual objects. Display subsystem 1006 may include one or more display devices utilizing virtually any type of technology. In some implementations, display subsystem 1006 may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the consent of the user may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. If used herein, a phrase of the form "at least one of A and B" means at least one A or at least one B, without being mutually exclusive of each other, and does not require at least one A and at least one B. If used herein, the phrase "and/or" means any or all of multiple stated possibilities.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An art investment estimation system, comprising:
    a processor and associated memory, the processor being configured to execute an estimator program stored in the memory to:
        store, in the memory, a database that is updated to include artwork price data including a first sale price and associated first sale date and a second sale price and associated second sale date for a plurality of works of art of a plurality of different artists;
        receive input from a user selecting an artist of the plurality of different artists;
        determine two or more investment value variables derived at least from the first sale price and associated first sale date and the second sale price and associated second sale date for the plurality of works of art associated with the selected artist, the two or more investment value variables being selected from the group consisting of market adjusted risk per unit of return ratio, salability, relative liquid market size, and loss likelihood;
        receive, via a user-designated weight input mechanism of a graphical user interface (GUI), input from the user indicating designated weights for each of the two or more investment value variables;
        determine, from the designated weights and the two or more investment value variables, an artist investment potential value for the selected artist, wherein the artist investment potential value is determined by the estimator program from one of a sum or product of the two or more investment value variables each multiplied by a respective designated weight, and a sum of the designated weights totals 1;
        train an artificial intelligence model on a training data set including the input from the user for the artist and the designated weights to the estimator program and the artwork price data, and, as ground truth output, a corresponding plurality of prior predicted results computed by the estimator program, the artificial intelligence model being a neural network;
        execute the trained artificial intelligence model to receive run-time user input of the selected artist and run-time user designated weights for the two or more investment value variables, and output a predicted result of the artist investment potential value; and
        at the GUI, display to the user the artist investment potential value, wherein
    the GUI further includes a suggest other artist selector configured to display one or more other artists from the database, the one or more other artists having a higher artist investment potential than the selected artist, the higher artist investment potential being determined from the one of the sum or product of the two or more investment value variables each multiplied by a respective one of the designated weights for the one or more other artists.

2. The art investment estimation system of claim 1, wherein, when the two or more investment value variables include the market adjusted risk per unit of return ratio, the processor is further configured to:
    determine a first compound annual return that is for each work of art of the selected artist in the database;
    determine a second compound annual return that is for each work of art in the database for a same year sale and same year purchase as each of the works of art of the selected artist;
    subtract the mean of the second compound annual returns from each of the first compound annual returns to determine a set of market adjusted returns for the selected artist;
    determine the mean of the set of market adjusted returns; and
    divide the mean of the set of market adjusted returns into a standard deviation of the set market adjusted returns for the selected artist to determine a coefficient of variability that is the market adjusted risk per unit of return ratio.

3. The art investment estimation system of claim 1, wherein, when the two or more investment value variables include the salability, the processor is further configured to:
    determine a total number of works of art sold at auction having a prior auction appearance for the selected artist;
    determine a total number of works of art offered for auction sale having a prior auction appearance for the selected artist;
    divide the total number of works of art sold at auction by the total number of works of art offered for auction sale having a prior auction appearance for the selected artist to determine a percent sold; and
    subtract the percent sold from one and add one to determine the salability.

4. The art investment estimation system of claim 1, wherein, when the two or more investment value variables include the relative artist liquid market size, the processor is further configured to:
    determine a total number of works of art sold at auction for the selected artist;

determine a total number of works of art sold at auction for an artist with a greatest number of works of art sold at auction in the database;

divide the total number of works of art sold at auction by the total number of works of art sold at auction for the artist with the greatest number of works of art sold at auction to determine a ratio; and subtract the ratio from one and add one to determine the relative artist liquid market size.

5. The art investment estimation system of claim 1, wherein, when the two or more investment value variables include the artist loss likelihood, the processor is further configured to:

determine a total number of works of art sold at a loss for the selected artist;

determine a total number of works of art sold at auction having a prior auction sale for the selected artist;

divide the total number of works of art sold at a loss by the total number of works of art sold at auction having a prior auction sale to determine a percent sold with negative compound annual return; and add one to the percent sold with negative compound annual return to determine the artist loss likelihood.

6. The art investment estimation system of claim 1, further comprising a server configured to store input from one or more users, the server being in communication with the processor, the processor further configured to:

receive, from the server, designated weights of a plurality of users for a plurality of artists in the database and store the designated weights in the memory;

determine one or more averaged values and/or variability of the designated weights of the plurality of users for each artist in the database; and determine, for the designated weights of at least one user, a score representing similarity of the designated weights of the at least one user compared to the one or more averaged values and/or variability of the designated weights of the plurality of users.

7. The art investment estimation system of claim 1, the processor further configured to:

receive, from the user, one or more artist names;

receive preferences of the user for a preferred range of the artist investment potential value;

for each of the one or more artist names, determine whether each artist is included in the database;

for the artists included in the database, determine weights for the two or more investment value variables to minimize a difference between the artist investment potential value and the preferred range of the artist investment potential value of the user; and at the GUI, display the determined weights and the difference.

8. The art investment estimation system of claim 1, the processor further configured to:

of artists included in the database, determine illiquid artists according to a predetermined threshold of repeat sale pairs per year;

assign each illiquid artist to one or more groups, the one or more groups determined according to at least one predetermined commonality;

from available repeat sale pairs data for the illiquid artists in the database, determine a median compound annual return from the first sale price and the second sale price of each of the repeat sale pairs for the one or more groups;

receive a user request for an illiquid artist investment potential value for a respective illiquid artist; and at the GUI, display to the user the median compound annual return for the one or more groups to which the illiquid artist has been assigned.

9. The art investment estimation system of claim 1, the processor further configured to:

receive, at the GUI, input from the user including a collection of artists and store the collection in the memory;

determine weights for the two or more investment value variables from at least one of the designated weights and predetermined weights;

for each artist included in the collection that is also in the database, determine the artist investment potential value from the two or more investment value variables and the determined weights;

at a predetermined interval, determine updated artist investment potential values based on updates to the database; and output the updated artist investment potential values to the user.

10. The art investment estimation system of claim 1, wherein artificial intelligence model is trained to determine an error offset between a predicted price outputted from a formulaic model and an actual price.

11. The art investment estimation system of claim 1, further comprising:

a collection curation tool graphical user interface including a collection selector to receive user input of a user art collection and a weights selector configured to receive user input of user-specific weights.

12. The art investment estimation system of claim 11, further comprising:

a sell suggestion selector configured to display a list of one or more sell suggestions including works of art in the user collection, the list being ranked based upon a computed artist investment potential for each artist associated with each work of art in the user collection, computed based on the user-specific weights.

13. The art investment estimation system of claim 11, further comprising:

a purchase suggestion selector configured to display a list of one or more purchase suggestions including works of art that are available for purchase, the list being ranked by artist investment potential computed based on the user-specific weights.

14. A method for use with a computing device including a processor and associated memory, the processor being configured to execute an estimator program stored in the memory, the method comprising:

at the processor:

storing, in the memory, a database that is continually updated to include artwork price data including a first sale price and a second sale price of a plurality of works of art of a plurality of different artists;

receiving input from a user selecting an artist of the plurality of different artists;

determining two or more investment value variables derived at least from the first sale price and the second sale price for the plurality of works of art associated with the selected artist, the two or more investment value variables being selected from the group consisting of market adjusted risk per unit of return ratio, salability, relative liquid market size, and loss likelihood;

receiving, via a user-designated weight input mechanism of a graphical user interface (GUI), input from the user indicating designated weights for each of the two or more investment value variables;

determining, from the designated weights and the two or more investment value variables, an artist investment potential value for the selected artist, wherein the artist investment potential value is determined by the estimator program from one of a sum or product of the two or more investment value variables each multiplied by a respective designated weight, and a sum of the designated weights totals 1;

training an artificial intelligence model on a training data set including the input from the user for the artist and the designated weights to the estimator program and the artwork price data, and, as ground truth output, a corresponding plurality of prior predicted results computed by the estimator program, the artificial intelligence model being a neural network;

executing the trained artificial intelligence model to receive run-time user input of the selected artist and run-time user designated weights for the two or more investment value variables, and output a predicted result of the artist investment potential value; and at the GUI, displaying to the user the artist investment potential value, wherein the GUI further includes a suggest other artist selector configured to display one or more other artists from the database, the one or more other artists having a higher artist investment potential than the selected artist, the higher artist investment potential being determined from the one of the sum or product of the two or more investment value variables each multiplied by a respective one of the designated weights for the one or more other artists.

15. The method of claim 14, wherein, when the two or more investment value variables include the market adjusted risk per unit of return ratio, the method further comprises, at the processor:

determining a first compound annual return that is for each work of art of the selected artist in the database;

determining a second compound annual return that is for each work of art in the database for a same year sale and same year purchase as each of the works of art of the selected artist;

subtracting the mean of the second compound annual returns from each of the first compound annual returns to determine a set of market adjusted returns for the selected artist;

determining the mean of the set of market adjusted returns; and dividing the mean of the set of market adjusted returns into a standard deviation of the set market adjusted returns for the selected artist to determine a coefficient of variability that is the market adjusted risk per unit of return ratio.

16. The method of claim 14, wherein, when the two or more investment value variables include the salability, the method further comprises, at the processor:

determining a total number of works of art sold at auction having a prior auction appearance for the selected artist;

determining a total number of works of art offered for auction sale having a prior auction appearance for the selected artist;

dividing the total number of works of art sold at auction by the total number of works of art offered for auction sale having a prior auction appearance for the selected artist to determine a percent sold; and subtracting the percent sold from one and adding one to determine the salability.

17. The method of claim 14, wherein, when the two or more investment value variables include the relative artist liquid market size, the method further comprises, at the processor:

determining a total number of works of art sold at auction for the selected artist;

determining a total number of works of art sold at auction for an artist with a greatest number of works of art sold at auction in the database;

dividing the total number of works of art sold at auction by the total number of works of art sold at auction for the artist with the greatest number of works of art sold at auction to determine a ratio; and subtracting the ratio from one and adding one to determine the relative artist liquid market size.

18. The method of claim 14, wherein, when the two or more investment value variables include the artist loss likelihood, the method further comprises, at the processor:

determining a total number of works of art sold at a loss for the selected artist;

determining a total number of works of art sold at auction having a prior auction sale for the selected artist;

dividing the total number of works of art sold at a loss by the total number of works of art sold at auction having a prior auction sale to determine a percent sold with negative compound annual return; and adding one to the percent sold with negative compound annual return to determine the artist loss likelihood.

19. The method of claim 14, the method further comprising, at the processor:

receiving, from the user, one or more artist names;

receiving preferences of the user for a preferred range of the artist investment potential value;

for each of the one or more artist names, determining whether each artist is included in the database;

for the artists included in the database, determining weights for the two or more investment value variables to minimize a difference between the artist investment potential value and the preferred range of the artist investment potential value of the user; and at the GUI, displaying the determined weights and the difference.

20. The method of claim 14, further comprising:

displaying a collection curation tool graphical user interface including a collection selector to receive user input of a user art collection and a weights selector configured to receive user input of user-specific weights.

21. The method of claim 20, further comprising:

displaying a sell suggestion selector configured to display a list of one or more sell suggestions including works of art in the user collection, the list being ranked based upon a computed artist investment potential for each artist associated with each work of art in the user collection, computed based on the user-specific weights.

22. The method of claim 20, further comprising:

displaying a purchase suggestion selector configured to display a list of one or more purchase suggestions including works of art that are available for purchase, the list being ranked by artist investment potential computed based on the user-specific weights.

* * * * *